United States Patent
Grunwald et al.

(10) Patent No.: US 10,890,838 B2
(45) Date of Patent: Jan. 12, 2021

(54) SYSTEM AND METHODS OF FLUORESCENCE MICROSCOPE CALIBRATION

(71) Applicant: University of Massachusetts, Boston, MA (US)

(72) Inventors: David Grunwald, Worcester, MA (US); Maximiliaan Huisman, Brookfield, MA (US); Carlas Smith, Delft (NL)

(73) Assignee: University of Massachusetts, Boston, MA (US)

( * ) Notice: Subject to any disclaimer, the term of this patent is extended or adjusted under 35 U.S.C. 154(b) by 0 days.

(21) Appl. No.: 16/703,614

(22) Filed: Dec. 4, 2019

(65) Prior Publication Data

US 2020/0174353 A1    Jun. 4, 2020

Related U.S. Application Data

(60) Provisional application No. 62/775,233, filed on Dec. 4, 2018.

(51) Int. Cl.
*G03B 21/20* (2006.01)
*G03B 21/00* (2006.01)
(Continued)

(52) U.S. Cl.
CPC ......... *G03B 21/204* (2013.01); *G02B 21/008* (2013.01); *G02B 21/0032* (2013.01); *G02B 21/361* (2013.01); *G02B 21/362* (2013.01)

(58) Field of Classification Search
CPC .............. G03B 21/204; G02B 21/0032; G02B 21/008; G02B 21/361; G02B 21/362;
(Continued)

(56) References Cited

U.S. PATENT DOCUMENTS

2002/0159065 A1    10/2002  Berstis
2016/0313249 A1*   10/2016  Pannhoff ............. G01N 21/278
2020/0080940 A1*    3/2020  Garsha ................ G01N 21/274

FOREIGN PATENT DOCUMENTS

JP       2008076126       4/2008

OTHER PUBLICATIONS

Young, I.T., et al: "Photonic calibration for fluorescence microscopy", SPIE⇒International Society for Optical Engineering. Proceedings, vol. 6859, Feb. 7, 2008 (Feb. 7, 2008), p. 685915.
(Continued)

*Primary Examiner* — Seung C Sohn
(74) *Attorney, Agent, or Firm* — Hamilton, Brook, Smith & Reynolds, P.C.

(57) ABSTRACT

The described embodiments are directed to a system and methods of calibrating a fluorescence microscope and/or light detection device using a calibrating apparatus. The apparatus may comprise a main body housing, a sensor head, and a microcontroller assembly disposed within the housing. The housing may include an adapter to mechanically couple the housing to a microscope. The sensor head may comprise (i) an optical power sensor to produce a power signal representative of an optical power magnitude of light applied to the optical power sensor, (ii) an optical wavelength sensor configured to produce wavelength information associated with the light applied to the optical wavelength sensor, and (iii) a light source configured to direct light toward a detection device associated with the microscope. The microcontroller assembly may be configured to generate an optical power magnitude value based on the power signal and adjusted according to the wavelength information.

25 Claims, 19 Drawing Sheets
(17 of 19 Drawing Sheet(s) Filed in Color)

(51) Int. Cl.
   *G02B 21/00*   (2006.01)
   *G02B 21/36*   (2006.01)
(58) Field of Classification Search
   CPC ............... G02B 21/0076; G01N 21/93; G01N 21/6458; G01N 21/274
   USPC ...................................................... 250/206.1
   See application file for complete search history.

(56) References Cited

OTHER PUBLICATIONS

Grunwald, D., et al: "Calibrating excitation light fluxes for quantitative light microscopy in cell biology", Nature Protocols, vol. 3, No. 11, Oct. 30, 2008.
Anonymous: "User's Guide Silicon Power/Wavehead OMH-6742B", Sep. 2, 2016 (Sep. 2, 2016) Retrieved from the Internet: URL:https://www.newport.com/medias/sys_master/images/images/hed/hb5/8985064177694/700516-0MH-6742.pdf [retrieved on Mar. 23, 2020].
Deagle, R. C et al: "Reproducibility in light microscopy: Maintenance, standards and SOPs", International Journal of Biochemistry and Cell Biology, Pergamon, GB, vol. 89, Jun. 9, 2017 (Jun. 9, 2017), pp. 120-124.
International Search Report and Written Opinion of PCT/US2019/064492 dated Apr. 3, 2020 titled "System and Methods of Fluorescence Microscope Calibration".

* cited by examiner

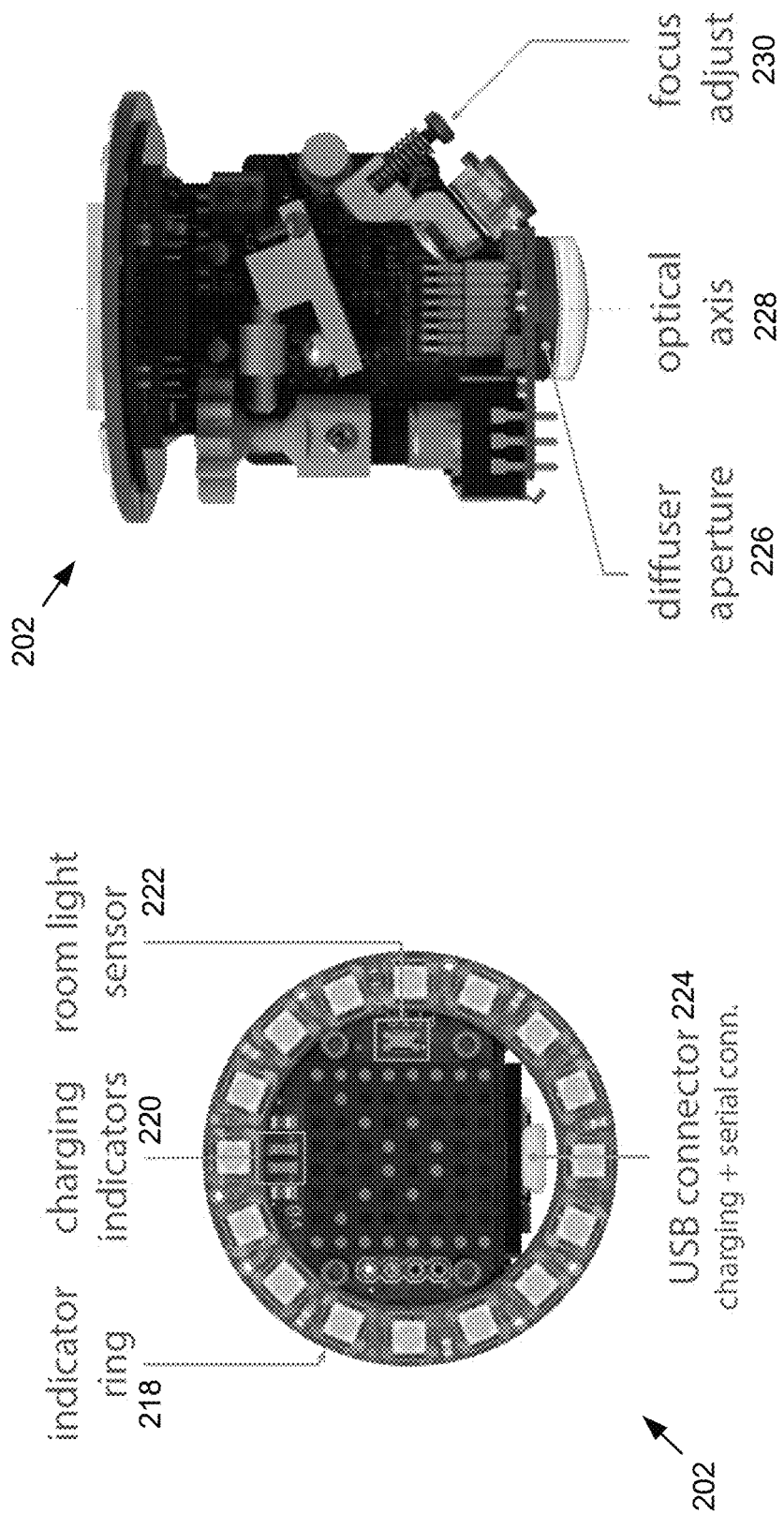

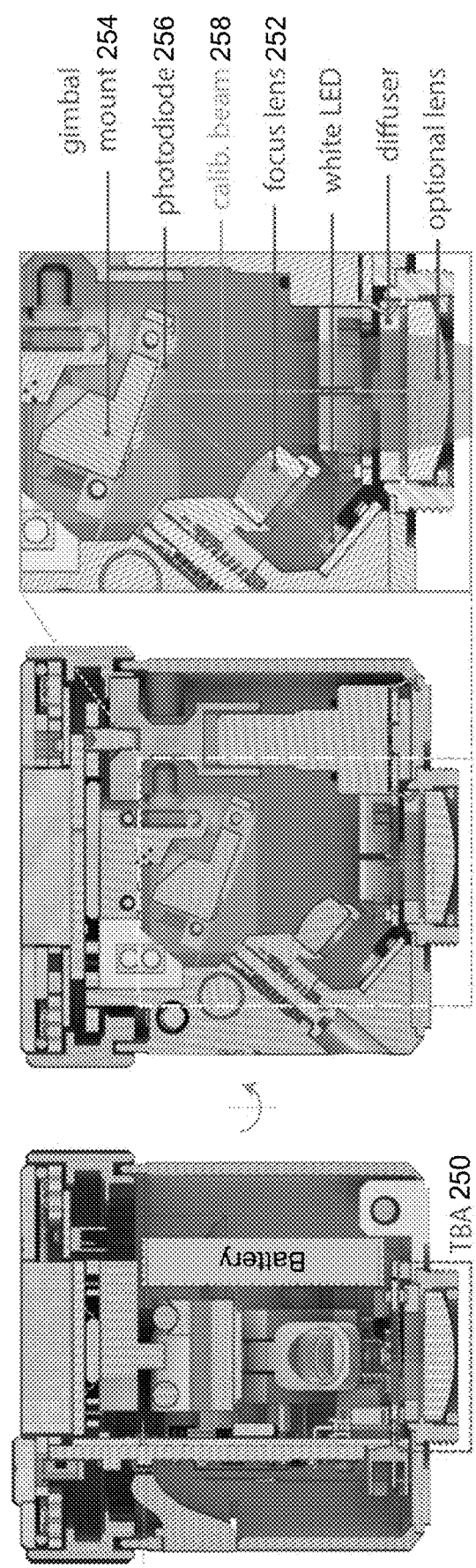

SYSTEM AND METHODS OF FLUORESCENCE MICROSCOPE CALIBRATION

RELATED APPLICATION

This application claims the benefit of U.S. Provisional Application No. 62/775,233, filed on Dec. 4, 2018. The entire teachings of the above application are incorporated herein by reference.

GOVERNMENT SUPPORT

This invention was made with government support under Grant No. DA047733 awarded by the National Institute of Health, and Grant No. P60016170000198 awarded by the Worcester Science Foundation. The government has certain rights in the invention.

BACKGROUND

Fluorescence microscopy is a powerful investigative tool used throughout the fields of material sciences, biophysics, molecular biology, cell biology, medical diagnostics, and various pharmaceutical application to collect data from a target sample. When such a target sample (e.g., an organic or inorganic specimen) is exposed to light of a single or limited wavelength width (termed "excitation light"), certain chemical moieties or other compounds (e.g., a tryptophan amino acid, certain dyes, or fluorescence proteins) in the sample may emit light (termed "emission light") in the form of fluorescence that may identify relevant structures or other properties of the target sample.

Typically, fluorescence microscopes deliver the excitation light to the target sample either through the same objective lens used to collect the emission light of the fluorescent molecules under observation, or through another mechanism. The excitation light used to illuminate the sample may emanate from a light source such as a laser light source or multi-wavelength light source. The excitation light may pass through one or more excitation filters designed to prevent all but a certain narrow range of light of a certain wavelength (e.g., an excitation wavelength) to pass through the filter. Once through the filter, the excitation light may be delivered to the sample by means of an objective and a dichroic mirror. The dichroic mirror is a specially designed optical filter that may reflect light of a certain excitation wavelength but permits the corresponding emission wavelength from the sample to pass through the dichroic mirror, or vice versa. The collected emission light then may be viewed by the naked eye or, more preferably, through the use of a detection device.

To provide the emission light as a usable image, the detection device, such as a CCD camera or the like, must be capable of imaging the emission light of target sample. While the use of various emission light detection devices is common, the detection characteristics of each device (and also the microscope) may differ. As a result, these differences in detection limits may make it difficult to compare the experimental results that may be collected using different microscopes or detection instruments between different laboratories or even through the use of a given instrument over time.

Another pressing issue when it comes to fluorescence microscopy is phototoxicity, that is, light-induced stress that may influence the behavior of the sample under observation. To minimize phototoxicity and to allow the assessment of the degree to which the effects of phototoxic may be present in the biological experiment that may be captured by the microscope image, a quantitative estimate of the excitation power (the amount of light used to excite the sample) is crucial.

SUMMARY

The embodiments of the invention described herein relate generally to microscopy and, more specifically, to a module for calibrating a fluorescence microscope and/or a fluorescence light detection device (e.g., a camera).

The described embodiments are directed to a system for, and method of, calibrating a fluorescence microscope and/or a detection device used to capture and image emission light from a target sample. The described embodiments may include a calibration apparatus configured to be attached to a fluorescence microscope and to measure the excitation characteristics of the microscope. These excitation characteristics may include, for example, the power and wavelength of the excitation light, detection of intensity-dependent variance, and back-aperture overfill of the objective. The described embodiments may facilitate measurement of the power of the excitation light delivered to the sample, or in some cases the back of the objective, and that measurement may then be reported along with the images obtained in the experiment.

The described embodiments of the apparatus may also facilitate the extraction of detector characteristics that allow model-based data analysis on the images acquired using the disclosed apparatus. For example, the described embodiments may generate different intensities of light that may permit measurement of variance maps for the detector that may help define a noise model of the detector. Noise models are camera-type-dependent but generally include, as a key parameter, the intensity and/or gain-dependent variance which, depending on the detector type, may be pixel-dependent (e.g., sCMOS cameras). Noise models may be used to improve data-analysis by enabling, for example, the use of statistics-based light detection and enhancement methods that may make the data obtained through the light detector more quantitative and reliable while reducing the degree of ambiguity introduced through manually set thresholds. Another example is the use in analyses that employ machine learning. Accurate detector models may be used to generate relevant training data for the analysis networks, making the networks more reliable, efficient and accurate.

Embodiments of the apparatus may be used also to calibrate a detection device by using the calibration apparatus to create a series of linearly increasing uniform intensity ramps of light. Images captured by the detection device of the intensity ramps may be then compared to other light data captured by the detection device to characterize the detection device.

Embodiments of the apparatus may generally include a main housing body comprising a control module, a sensor head, and a reflector assembly. An embodiment may comprise a main body housing that hosts a microcontroller configured to communicate with and/or control the sensor head. The sensor head may include a sensor board having one or more sensors (e.g., photodiodes, thermopile power detectors, light dependent resistors, photovoltaic detectors) one or more temperature sensors, one or more light sources (e.g., light emitting diodes, lamps, lasers) to emit light over a certain wavelength range, and one or more light sensors to measure emission light from the target sample. An adaptor may be disposed at an end of the apparatus for attachment to a microscope. Additionally, a receiving area positioned between the adapter and the sensor board may be configured to removably accept one or more of a converging lens, a diverging lens, a fixed-size iris, a variable-sized iris, or a light filter, as needed by the user.

Other embodiments of the apparatus may include one or more multi-color light emitting diodes as a light source, one or more multi-color light sensors, one or more temperature sensors, and one or more optical power sensors, each disposed on the sensor board. The light sources and photodetectors may emit and detect narrow or broad light wavelength ranges according to a user specified application such that both intensity and wavelength may be detected and peaked (i.e. 'single color') as well as to generate broad-spectrum light (i.e., "temperature light").

Embodiments of the apparatus may also include a reflector assembly positioned between the sensor board and light receiving area that may permit a user to direct incoming or outgoing light to a specific sensor or light source. The reflector assembly may include a reflective surfaces unit comprising one or more reflective surfaces disposed about the inside surface of the reflective surfaces unit, one or more reflective elements positioned on a movable mount (e.g., a mirror or prism) to direct the path of incoming or outgoing light, and a selector mechanism mechanically linked to the mount. Through the use of the selector mechanism, a user may rotate the mount in order to configure the angle of the reflective elements (e.g., a ratiometric beam splitter positioned in the path of incoming and outgoing light) to direct light to a reflective surface—which may be aligned with a sensor or light source—and the light is then reflected to a specific sensor or light source. In an example embodiment, the reflective surfaces are curved (e.g., a convex surface) and configured to direct the optimal amount of light to the sensors.

Embodiments of the apparatus may combine one or more of a light power sensor, a temperature sensor, a wavelength detection sensor (e.g., a red-green-blue RGB sensor), and a multi-color LED light source into a single, portable, microscope calibration module that may function as a power meter with an integrated calibrated light source. This may allow a user to switch back and forth—using the reflector assembly—between the use of specific sensors (e.g., temperature sensor and light sensor) as well the use of specific light sources without a time-consuming switching of the individual sensor positions and individual adjustment of the reflective element during use.

Some embodiments of the apparatus may measure incoming light over a wide range of wavelengths (e.g., 10 nm-1000 nm) and, usefully, may also create light of known intensity in the same wavelength range according to the type of light source used with the apparatus. The emitted light may be adjusted linearly, non-linearly, or a combination of linearly and non-linearly, over a wide range of the power spectrum (typically micro Watts to Watts).

Some embodiments of the apparatus may include an attachment mechanism (e.g., a thread adapter, friction-fit adaptor) to permit a user to attach and remove the apparatus easily from any known microscope system. Some embodiments of the invention may also include a temperature sensor so that calibration of the microscope or detection device may mitigate any effect on the light sensor caused by heat buildup from the light source. This may eliminate the need to cool the apparatus during use to stabilize the sensor. Embodiments of the apparatus may be used to estimate the excitation light wavelength using an integrated RGB sensor or a mini-spectrometer. Embodiments of the apparatus may be used to detect aperture-overfill of the objective. Other embodiments may include multiple aperture overfill detectors to determine the centroid over the overfilling beam for alignment purposes (e.g., through triangulation). Embodiments of the apparatus may be positioned either in place of an objective or positioned in the sample position to calibrate the microscope.

Embodiments of the apparatus may be operated remotely by a user via wireless connectivity (e.g., Bluetooth®, WiFi, Zigbee, 3G, 4G or 5G cellular protocols) through the use of a handheld or otherwise portable device (e.g., smartphone, hand-held tablet etc.). The apparatus may be also miniaturized and permanently integrated into a microscope. Embodiments of the apparatus may include an integrated quadrant detector to facilitate light power measurements that may be used to detect and correct alignment errors between the light source and objective.

Embodiments of the apparatus may be calibrated both for the detection of emission light and generation of excitation light against an integration sphere or other suitable methods connected in order to a power meter to measure light output and linearity of the light source. After such calibration, the apparatus may be then calibrated internally through a periodic comparison to a power meter reading of light source.

In one aspect, the invention may be an apparatus for calibrating a microscope, comprising a main body housing, a sensor head, and a microcontroller assembly. The main body housing may have an adapter configured to mechanically couple the main body housing to a microscope. The sensor head may be disposed within the main body housing. The sensor head may comprise (i) an optical power sensor configured to produce a power signal representative of an optical power magnitude of light applied to the optical power sensor, and (ii) an optical wavelength sensor configured to produce wavelength information associated with the light applied to the optical wavelength sensor. The microcontroller assembly may be in communication with the sensor head. The microcontroller assembly may be configured to generate an optical power magnitude value based on the power signal, and to adjust the optical power magnitude value according to the wavelength information. In some embodiments, the microcontroller assembly may be disposed within the main body housing. In other embodiments, the microcontroller assembly may be disposed outside of the main body housing (e.g., within the microscope system or remote to the microscope system and the main body housing) and communicate with the sensor head by a wired or wireless communication link.

The optical wavelength sensor may comprise a red-green-blue (RGB) optical sensor. The optical power magnitude value may be further adjusted according to a temperature of the optical power sensor. The microcontroller assembly may comprise a display. The microcontroller assembly may be further configured to produce a calibration result based on the optical power magnitude value and to display the calibration result on the display. The light applied to the optical power sensor may be excitation light that the microscope uses to illuminate a specimen.

The sensor head further may further comprise a light source. The light source may be a broad-spectrum light source. The light source may be a multi-color light emitting diode. The optical power sensor may be a reflective surface, and the light source may be configured to direct light toward a detection device by directing the light toward the reflective surface, so that the light is reflected from the reflective surface and through a main aperture of the apparatus.

The sensor head may further comprise a temperature sensor and one or more light sensors. The apparatus may further comprise at least one of a converging lens, an iris, and light filter disposed within the main body housing. The iris may be may have a fixed aperture or a variable aperture. The microcontroller assembly may further generate an estimate of a wavelength of the light applied to the optical wavelength sensor based on the wavelength information. The microcontroller assembly may generate the optical power magnitude value based on the power signal, and adjust the optical power magnitude value according to the estimate of the wavelength of the light applied to the optical wavelength sensor.

The microcontroller assembly may further comprise a wireless transceiver configured to wirelessly communicate with external transceiver connected to a communications network. The communications network may be the Internet. The apparatus may further comprise a reflector assembly that comprises a reflective surfaces assembly including an interior surface defining a central opening, and one or more reflective surfaces radially distributed about the interior surface of the reflective surfaces assembly. The reflector assembly may further comprise one or more reflective elements attached to a mount and positioned within the central opening in a path of incoming or outgoing light. The reflector assembly may further comprise a selector mechanism mechanically linked to the mount such that movement of the selector mechanism rotates the mount to adjust an angle of the one or more reflective elements to direct the incoming or outgoing light to the one or more reflective surfaces, where the light is then reflected onto the one or more sensors. The one or more reflective elements may be a dichroic mirror or a prism. The one or more reflective surfaces may be a convex surface.

The apparatus may be coupled, using the adapter, to an objective mounting aperture of an objective turret of the microscope. The apparatus may further comprise an orientation sensor that produces an orientation signal representative of an orientation of the apparatus. The microcontroller assembly may initiate an excitation calibration procedure when the orientation signal indicates that the apparatus is in an active objective position.

In another aspect, the invention may be an apparatus for calibrating a microscope, comprising a main body housing, a sensor head, and a microcontroller assembly. The main body housing may have an adapter configured to mechanically couple the main body housing to a microscope. The sensor head may be disposed within the main body housing. The sensor head may comprise (i) an optical power sensor configured to produce a power signal representative of an optical power magnitude of light applied to the optical power sensor, (ii) an optical wavelength sensor configured to produce wavelength information associated with the light applied to the optical wavelength sensor, and (iii) a light source configured to direct light toward a detection device associated with the microscope. The microcontroller assembly may be disposed in the main body housing and in communication with the sensor head. The microcontroller assembly may be configured to generate an optical power magnitude value based on the power signal, and to adjust the optical power magnitude value according to the wavelength information. The microcontroller assembly may be further configured to calibrate the microscope and/or the detection device associated with the microscope. The calibration may comprise one or both of characterization of the detection device and characterization of the excitation light of the microscope. A component on the sensor head may have a reflective surface, and the light source may be configured to direct light toward a detection device by directing the light toward the reflective surface, thereby reflecting the light from the reflective surface and through a main aperture of the apparatus toward the detection device.

In another aspect, the invention may be a method of calibrating a detection device, comprising providing an apparatus comprising a main body housing, a sensor head, and a microcontroller assembly. The main body housing may have an adapter configured to mechanically couple the main body housing to a microscope. The sensor head may be disposed within the main body housing. The sensor head may comprise (i) an optical power sensor configured to produce a power signal representative of an optical power magnitude of light applied to the optical power sensor, (ii) an optical wavelength sensor configured to produce wavelength information associated with the light applied to the optical wavelength sensor, and (iii) a light source configured to direct light toward a detection device associated with the microscope. The microcontroller assembly may be in communication with the sensor head, and configured to generate an optical power magnitude value based on the power signal and adjusted according to the wavelength information. The method may further comprise attaching the apparatus to the microscope or the detection device, emitting light from the light source disposed on the sensor head, detecting the light by a light sensor disposed on the sensor head, calculating an intensity of light emitted by the light source, measuring an intensity of light detected by the detection device, comparing the intensity of light emitted by the calibration apparatus to the intensity of light detected by the microscope or light detector, and calibrating, by the apparatus, the microscope or detection device based upon a difference in intensity of light emitted by the apparatus and the intensity of light detected by the microscope or detection device.

Emitting light from the light source may further comprise generating a series of linearly increasing intensity ramps of light, and capturing, by the microscope or detection device, an image of each of the series of linearly increasing intensity ramps of light.

The method may further comprise comparing an intensity of light, detected by the microscope or the light detector in each of the series of linearly increasing intensity ramps of light, to an intensity of light emitted by the light source for each of the series of linearly increasing intensity ramps of light. The method may further comprise measuring the optical power magnitude value and storing the measured optical power magnitude value.

BRIEF DESCRIPTION OF THE DRAWINGS

The patent or application file contains at least one drawing executed in color. Copies of this patent or patent application publication with color drawings will be provided by the Office upon request and payment of the necessary fee.

The foregoing will be apparent from the following more particular description of example embodiments, as illustrated in the accompanying drawings in which like reference characters refer to the same parts throughout the different views. The drawings are not necessarily to scale, emphasis instead being placed upon illustrating embodiments.

FIGS. 2A through 2K illustrate an alternative example embodiment of the apparatus shown in FIGS. 1A-1M, according to the invention.

DETAILED DESCRIPTION

A description of example embodiments follows.

The teachings of all patents, published applications and references cited herein are incorporated by reference in their entirety.

The described embodiments are directed to a system for and method of calibrating a fluorescence microscope and associated emission light detection devices through the use of a calibration apparatus. Embodiments of the calibration apparatus may measure also the amount of light applied to the sample and/or objective and may monitor the light source for stability and power output.

Figure 1A:
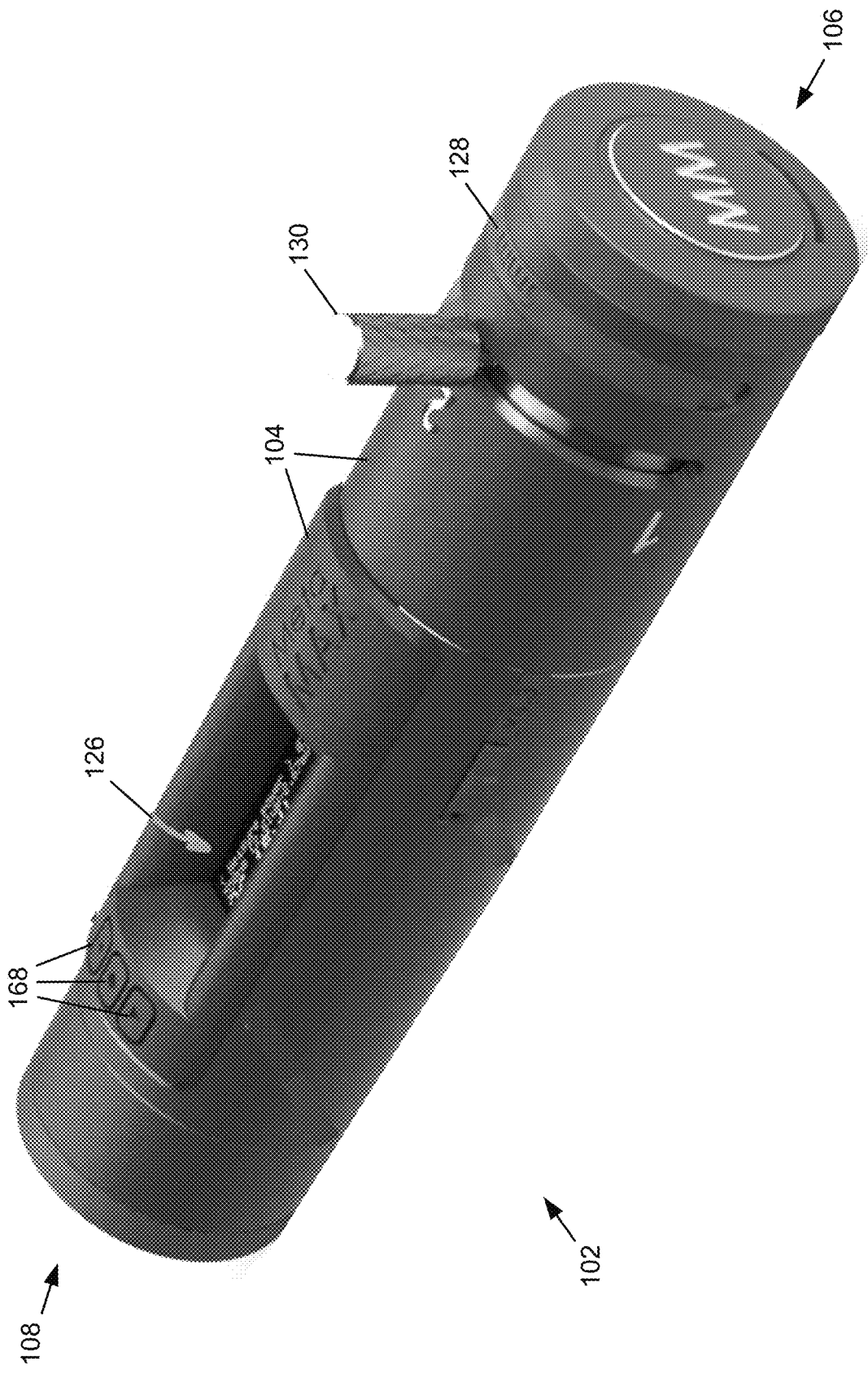
FIGS. 1A through 1M illustrate an example embodiment of a system for calibrating a fluorescence microscope and associated emission light detection devices, according to the invention.
Figure 1B:
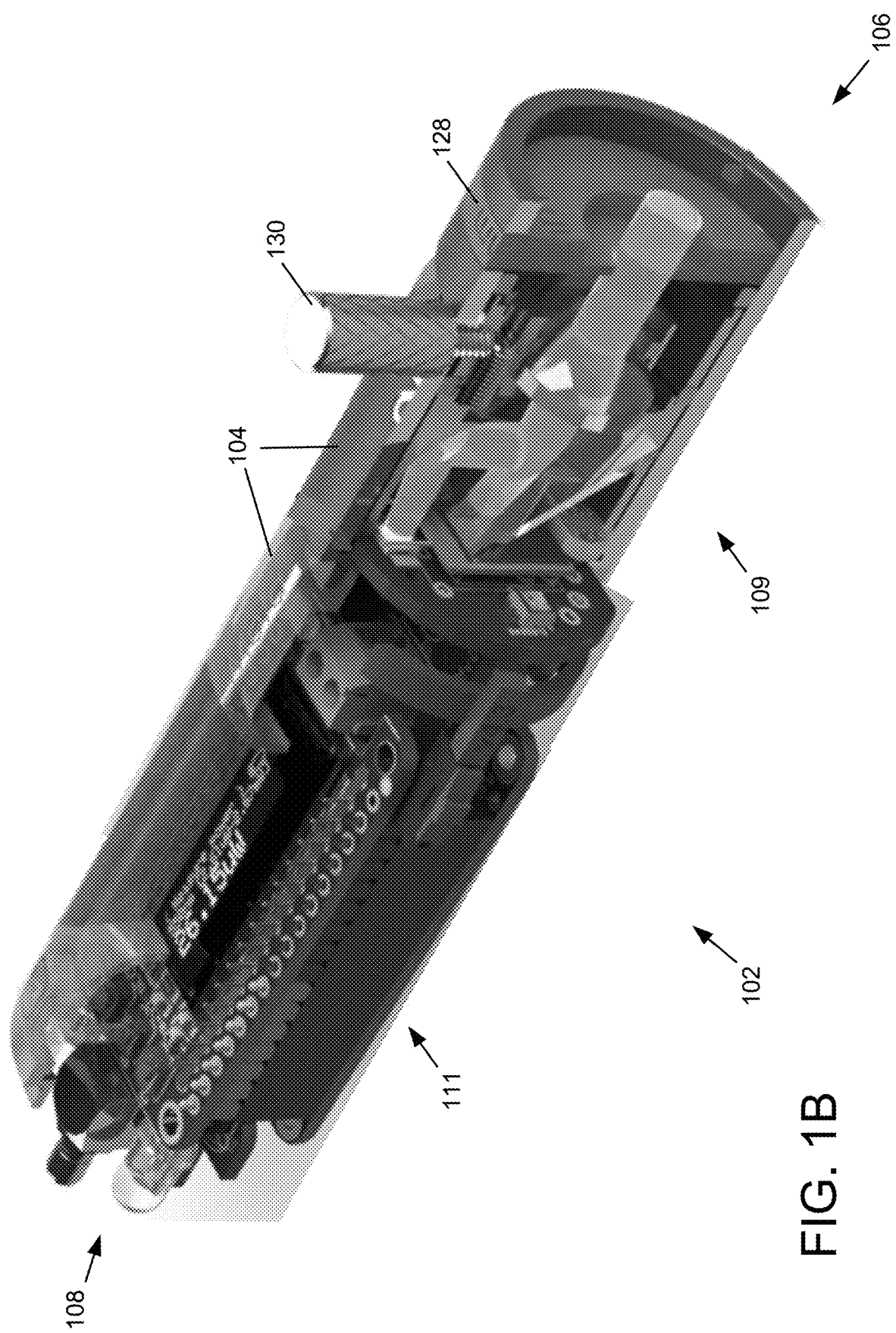
Figure 1C:
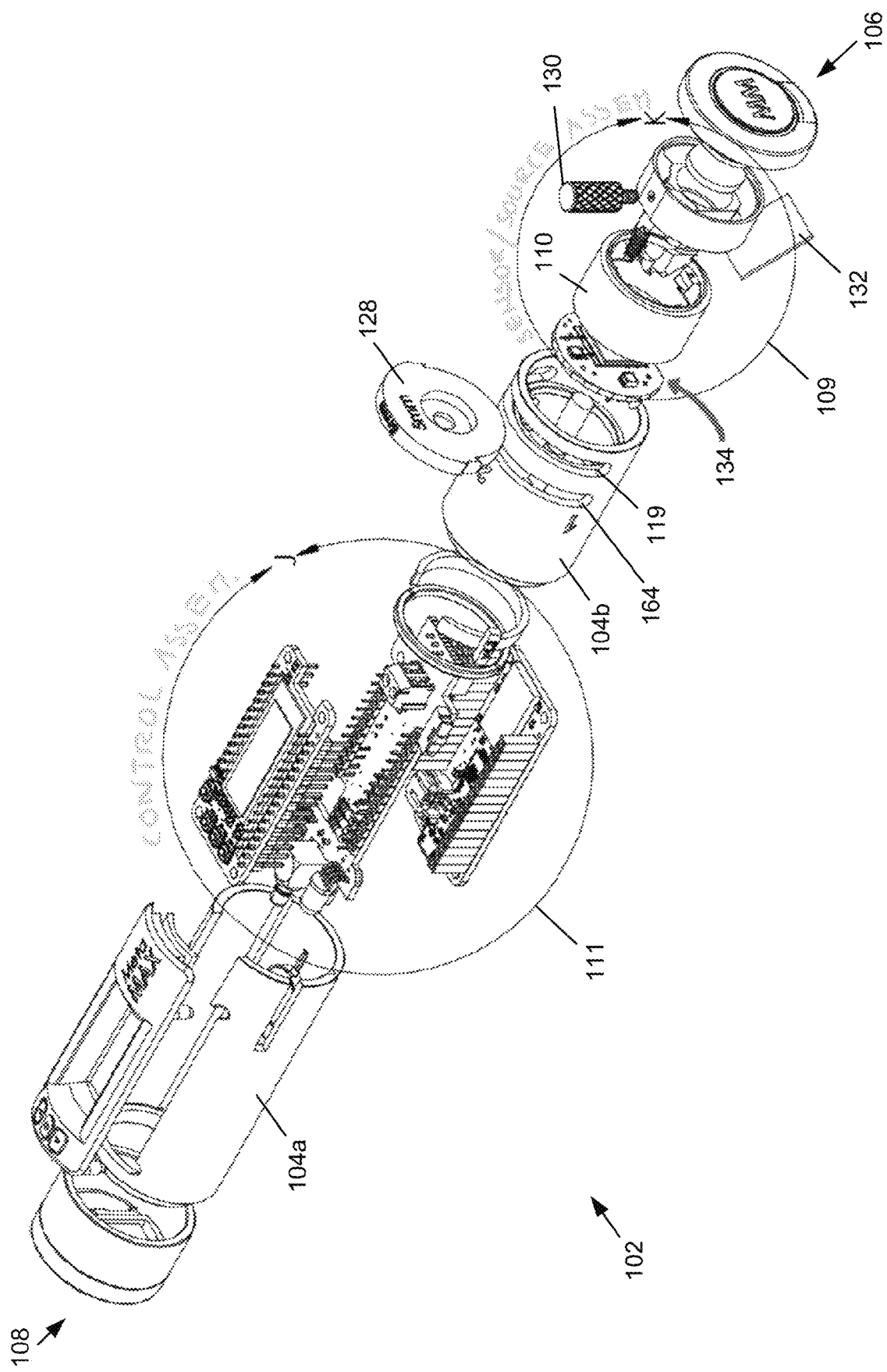

FIGS. 1A through 1M illustrate an example embodiment of a system for calibrating a fluorescence microscope and associated emission light detection devices according to the invention (referred to herein as the "system"). The system may comprise a calibration apparatus 102. FIG. 1A illustrates a view of the calibration apparatus, FIG. 1B shows a cut-away view of the calibration apparatus 102, and FIG. 1C shows an exploded view of the calibration apparatus 102. The specific components of apparatus 102 described herein are presented as examples for descriptive purposes, and are not intended to be limiting. The underlying functionality of the components may be accomplished with alternative form factors and arrangements.

Figure 1D:
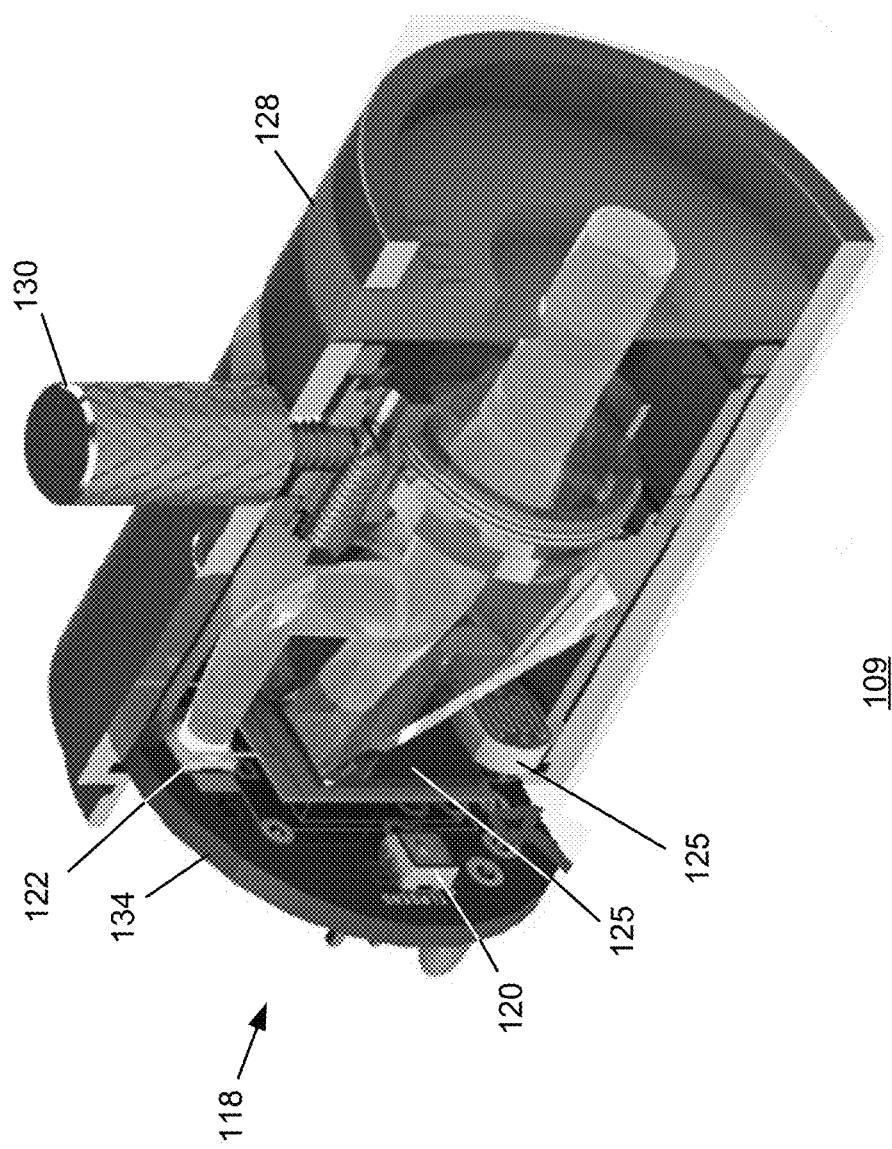

The calibration apparatus 102 may comprise at least one main body housing 104 having a proximal end 106 and a distal end 108. The main body housing may comprise a first subsection 104a and a second subsection 104b. The calibration apparatus 102 may further comprise a sensor/source assembly 109 (see, e.g., FIGS. 1D-1I) and a control assembly 111. FIG. 1D shows a sectional view of the assembled sensor/source assembly 109, and FIGS. 1G, 1H, and 1I illustrate front, side and back views of the sensor/source assembly 109, respectively.

Figure 1E:
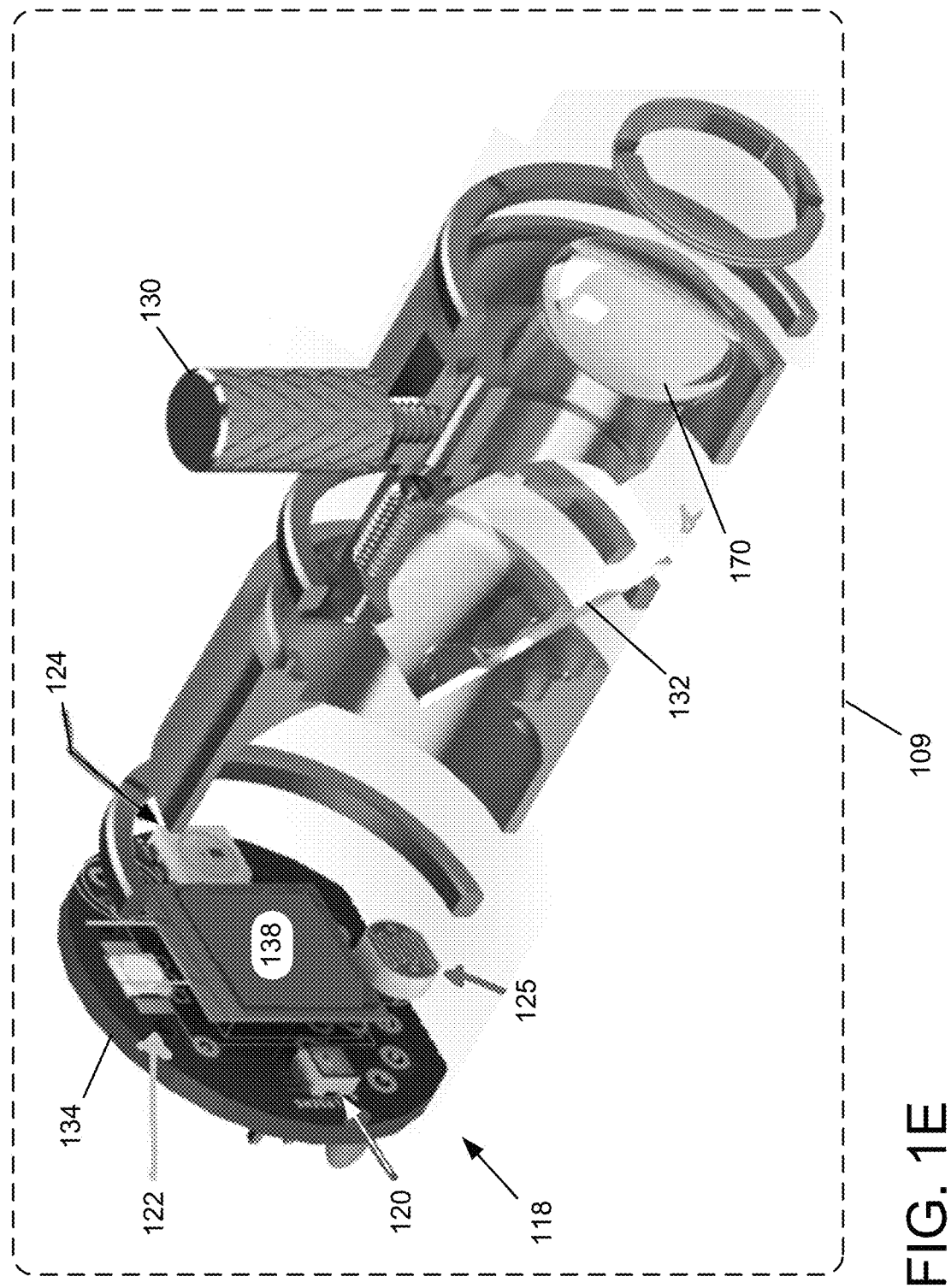

Referring to FIG. 1E, the sensor/source assembly 109 may comprise a reflective surfaces unit 110, reflective element 132 that functions as a 50/50 splitter, a selector mechanism 130, and an adapter 112. The control assembly 111 may comprise a microcontroller assembly 114 having one or more microprocessors 116, a sensor head 118, and a display area 126. The sensor head 118 may comprise a sensor circuit board 134 that may host a variety of light sensors and sources.

The main body housing 104 may be constructed of any lightweight plastic, polymer, metal, or in any combination that may permit the main body housing 104 to be sized and shaped to form a generally hollow tubular structure to house the various apparatus components disposed therein. The main body housing 104 may include one or more subsections (e.g., 104a, 104b) or may be constructed of a single unitary main body housing. In an example embodiment, the main housing body 104 may be printed using a 3-D printer. Alternatively, the main body housing 104 may be constructed of a light weight metal such as anodized aluminum.

Figure 1F:
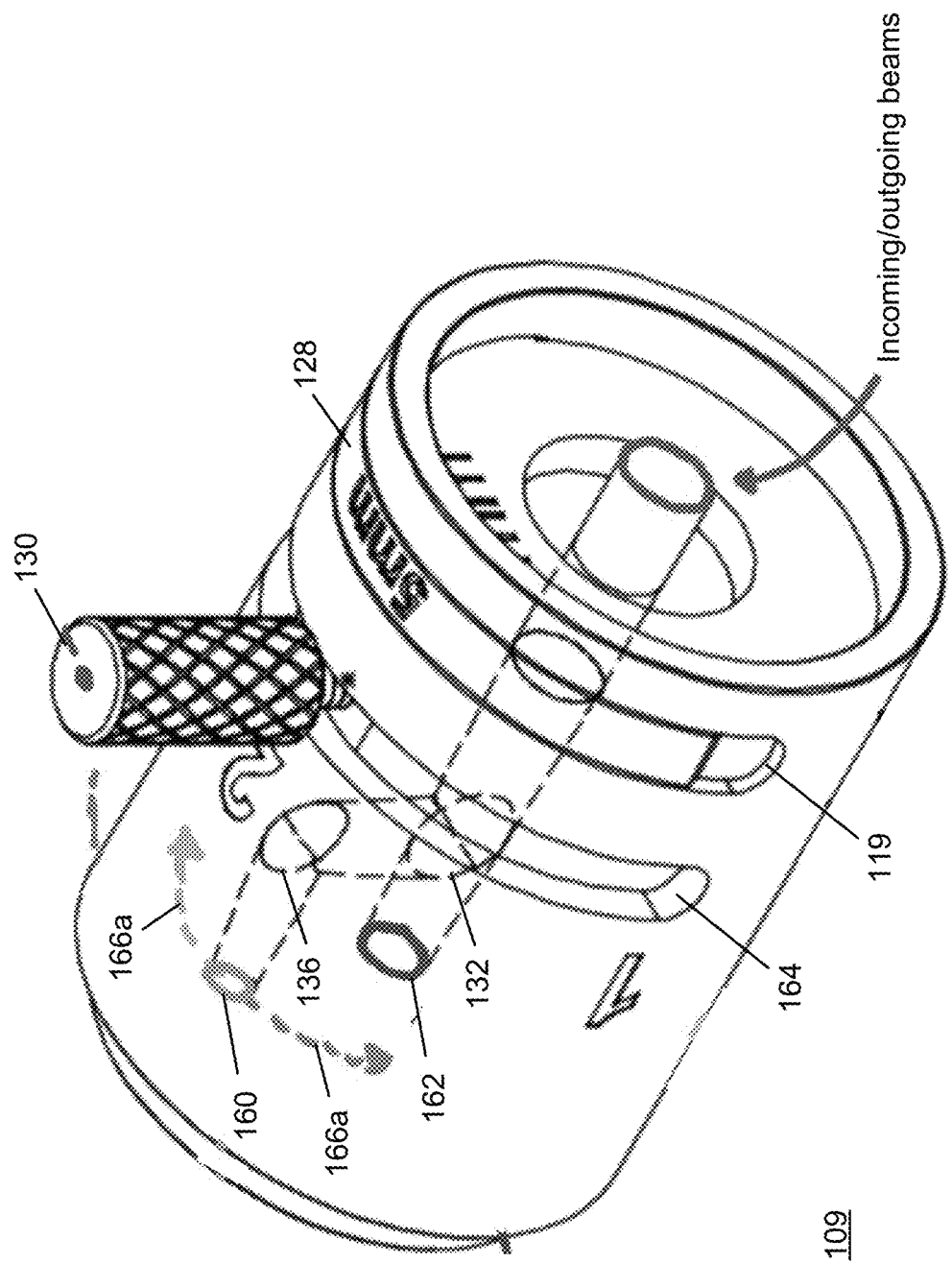
Figure 1I:
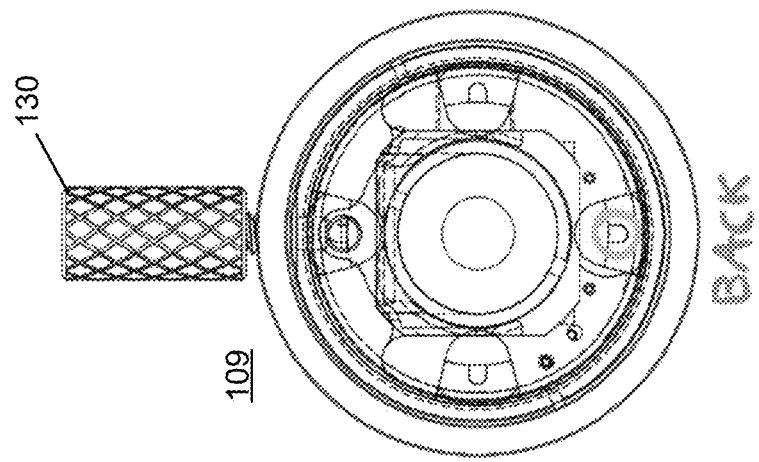
Figure 1H:
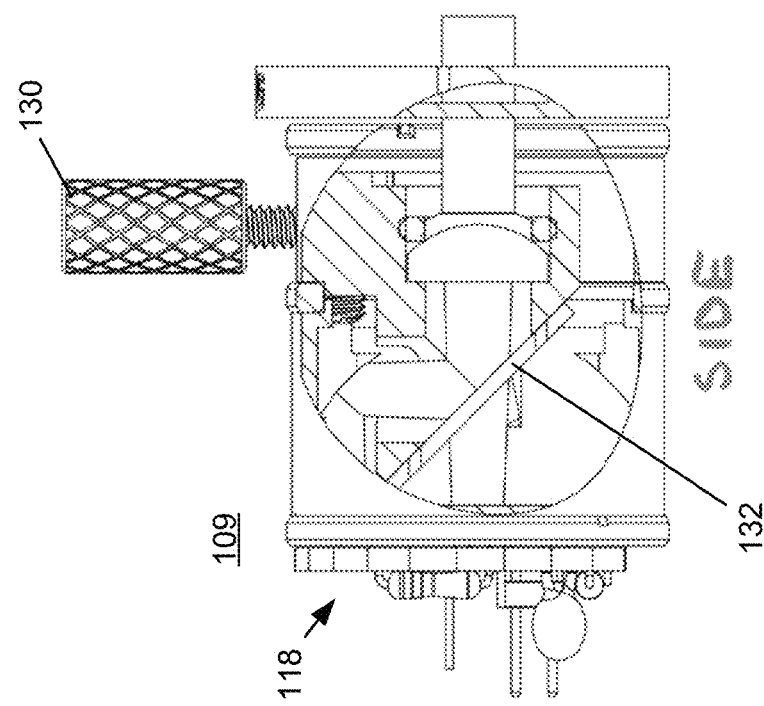
Figure 1G:
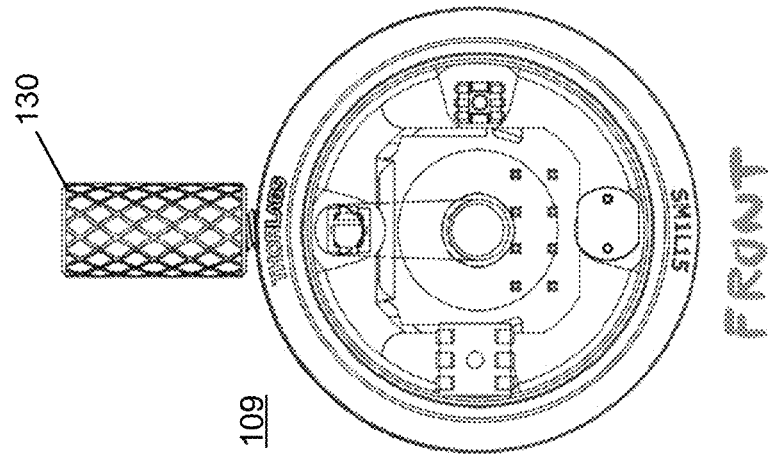
Figure 1J:
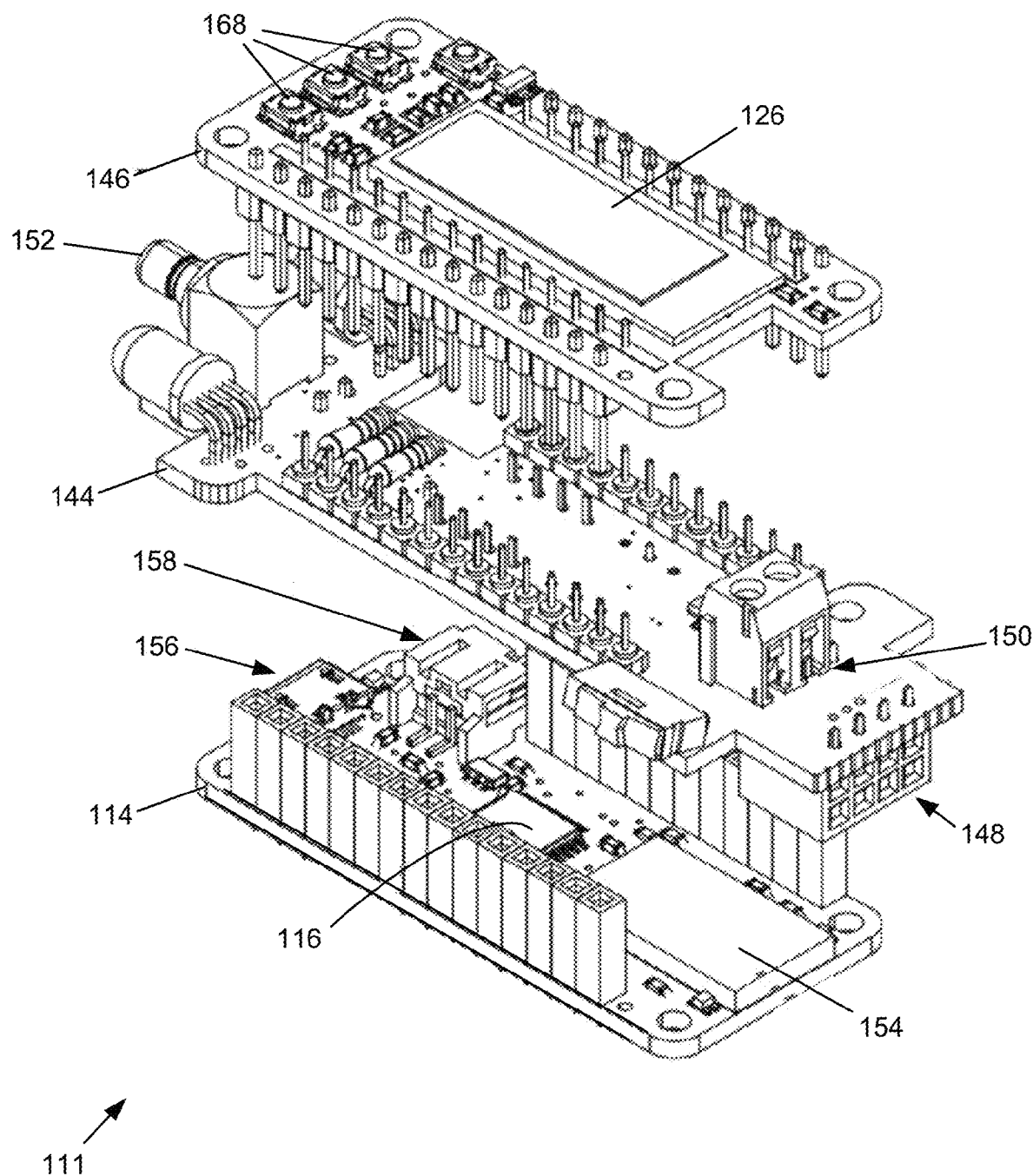

Referring to FIG. 1J, the control assembly 111 may comprise the microcontroller assembly 114, a main board 144 and a control board 146. The control assembly 111 may provide various I/O connectors, such as a sensor board connector 148, a photodiode and photodiode sensor connector 150, and an external triggering source connector 152. The control board 146 may comprise a display 126 (e.g., an OLED display), and input control resources such as buttons and switches 168. The microcontroller assembly 114 may be in communication with the microprocessor 116 that, in turn, may interface with the sensor board 134. The microcontroller assembly 114, which in an example embodiment may be implemented by a device such as an Arduio or Adafruit microcontroller (e.g., a 3.3V Adafruit Feather controller) may include a microprocessor 116, and components such as a wireless transceiver module 154 capable of wirelessly communicating with an external transceiver (e.g., Bluetooth®, WiFi, Zigbee, a cellular protocol such as 3G, 4G, or 5G, etc.), a USB connection interface 156, and a battery connection interface 158. The microcontroller assembly 114 may be configured to operate and control all the sensors and other components forming the sensor head 118.

Referring again to FIG. 1E, the sensor head 118 may include a sensor circuit board 134 that hosts a centrally located power sensor 138 and one or more other components radially distributed about the edge of the sensor circuit board 134. The centrally located power sensor 138 may comprise an integrative sensor that facilitates accurate excitation power measurement. In an example embodiment, the power sensor 138 may be a photodiode. The radially distributed components may comprise one or more red-green-blue (RGB) light sensors 120 (or other such optical wavelength sensor), one or more temperature sources 122, one or more multi-color light sources 124, and one or more stray light sensors 125.

The one or more red-green-blue (RGB) light sensor(s) 120 may be configured to estimate the excitation wavelength of incident light for wavelength-specific power measurement. The RGB sensor may comprise three integrated light sensors, each with different sensitivity to red, blue, or green light. The microcontroller assembly may receive detection values from each of these three components, and perform a fitting routine on the detection values that predicts the wavelength based on the RGB ratios.

The temperature source(s) 122 may comprise a temperature light emitting diode (LED) that emits broad-spectrum light for detector characterization. The multi-color light source(s) 124 may comprise a multi-color LED, which selectively emits light in a single color for wavelength-dependent detector characterization. The stray light sensor(s) 125 may comprise a light dependent resistor (LDR) sensor that measures stray light from aperture overfill and is used for self-calibration. In certain embodiments, the sensor circuit board 134 may be sized and shaped (e.g., circular) to fit the inside diameter of the main body housing 104.

One or more temperature sensors (not shown), attached to or in communication with the sensor circuit board 134, may be used to measure local temperature variations during calibration. For example, the multi-color light source(s) 124 may produce a small amount of heat during use, which may affect the accuracy of the information collected by the light sensor 120. Alternatively, heat buildup in the apparatus 102 may also occur from the ambient temperature as well as from any incoming light. Measurement of any changes in the temperature of the apparatus 102 due to heat buildup may be used to compensate for any error of the light sensor 120 introduced by the heat. This may reduce or eliminate the need to regulate the temperature of the apparatus 102 during calibration.

Suitable light sensors 120 may include any photoelectric devices that may convert light energy into an electronic signal. Such light sensors 120 may be configured to detect light of certain wavelengths that may range from infrared light to ultraviolet light. In some embodiments, the light sensors 120 may be configured to detected electromagnetic radiation of a wavelength range defined by the used sensor from nm to micrometers, preferably from the near UV wavelength (350 nm) to the near infrared wavelength (900 nm). However, the use of multiphoton excitation may include wavelength of 1600 nm to 2400 nm. Embodiments may include a light sensor configured to detect light of a wavelengths of about 10 nm to about 1000 nm, and preferably about 200 nm to about 850 nm, and more preferably, about 350 nm to about 800 nm. The sensor head 118 may include several light sensors 120, each of which may be configured to detect light of a different wavelength or the same wavelengths. Exemplary light sensors for use with the described embodiments may include photovoltaic sensors, photodiodes, and light dependent resistors. Certain embodiments may include one or more photodiodes configured to measure light intensity/power.

Certain embodiments may include one or more red, green, and blue (RGB) light sensors that may be sensitive to light wavelengths in the red, green, and blue wavelengths of incoming or outgoing light. As it is known that light wavelength effects the accuracy of photodiode measurements (e.g., a light power sensor), the RGB light sensors may detect the relative signal from each of red, green, and blue wavelengths and may be used to estimate the wavelength of the incoming or outgoing light rather than requiring the user to provide such data. An example embodiment of the RGB sensors may utilize the TCS3472 sensor manufactured by AMS AG.

The sensor head 118 and sensor circuit board 134 may also include additional sensors such as a leveling sensor, a quadrant detector (or other photodetector array) to determine whether the incoming light is 'on axis', a vibration detector to evaluate stability, or positional sensors to detect the selected optical configuration of the apparatus 102.

The multi-color light source 124 (also referred to as "excitation light source") may comprise any light source that is capable of emitting light in the desired wavelength as described herein, such as a laser, a light emitting diode, a multi-color light emitting diode, an incandescent bulb, or other white light or full light spectrum source. Available light sources may emit light in wavelengths from 10 nm to 2400 nm. In certain embodiments, the multi-color light source 124 may include one or more multi-color light emitting diodes, such as a red-green-blue light emitting diode and/or a broad-spectrum temperature light emitting diode configured to transmit light in wavelengths of about 10 nm to about 1000 nm, and preferably about 200 nm to about 850 nm, and more preferably, about 350 nm to about 800 nm.

Figure 1K:
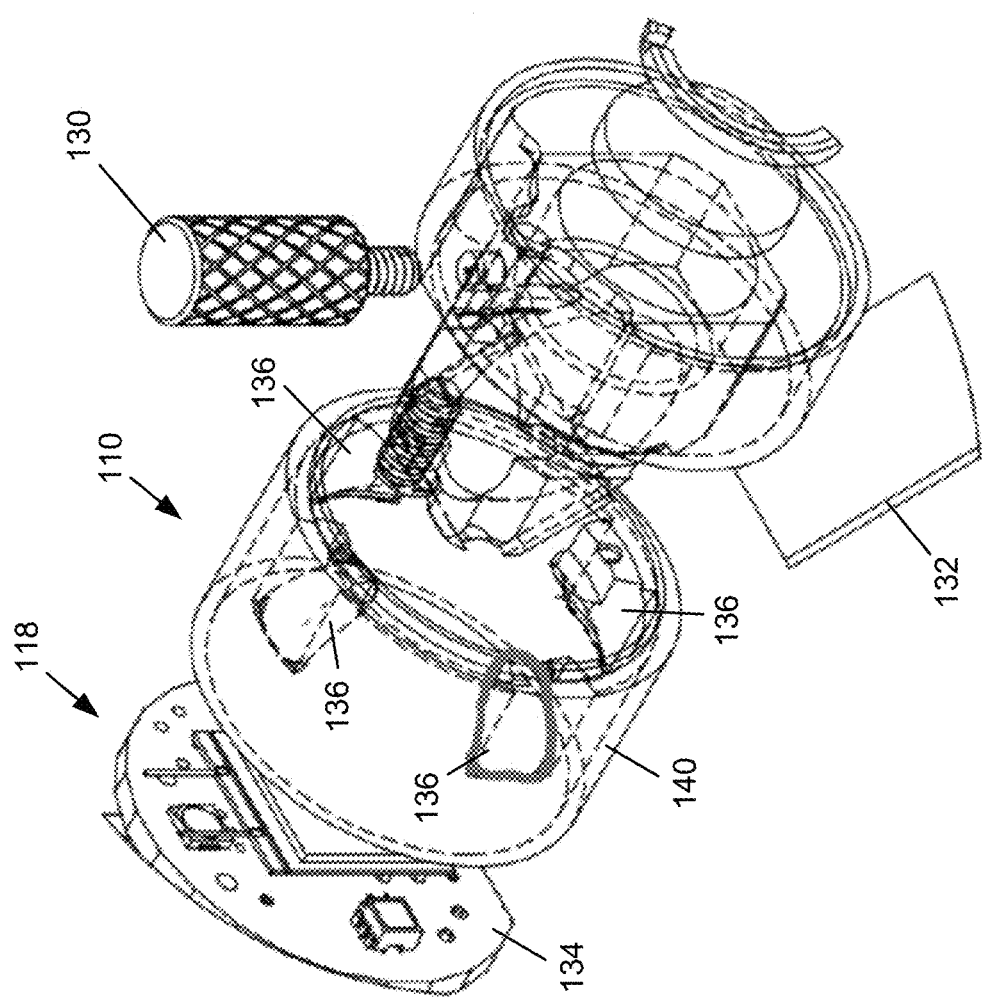
Figure 1L:
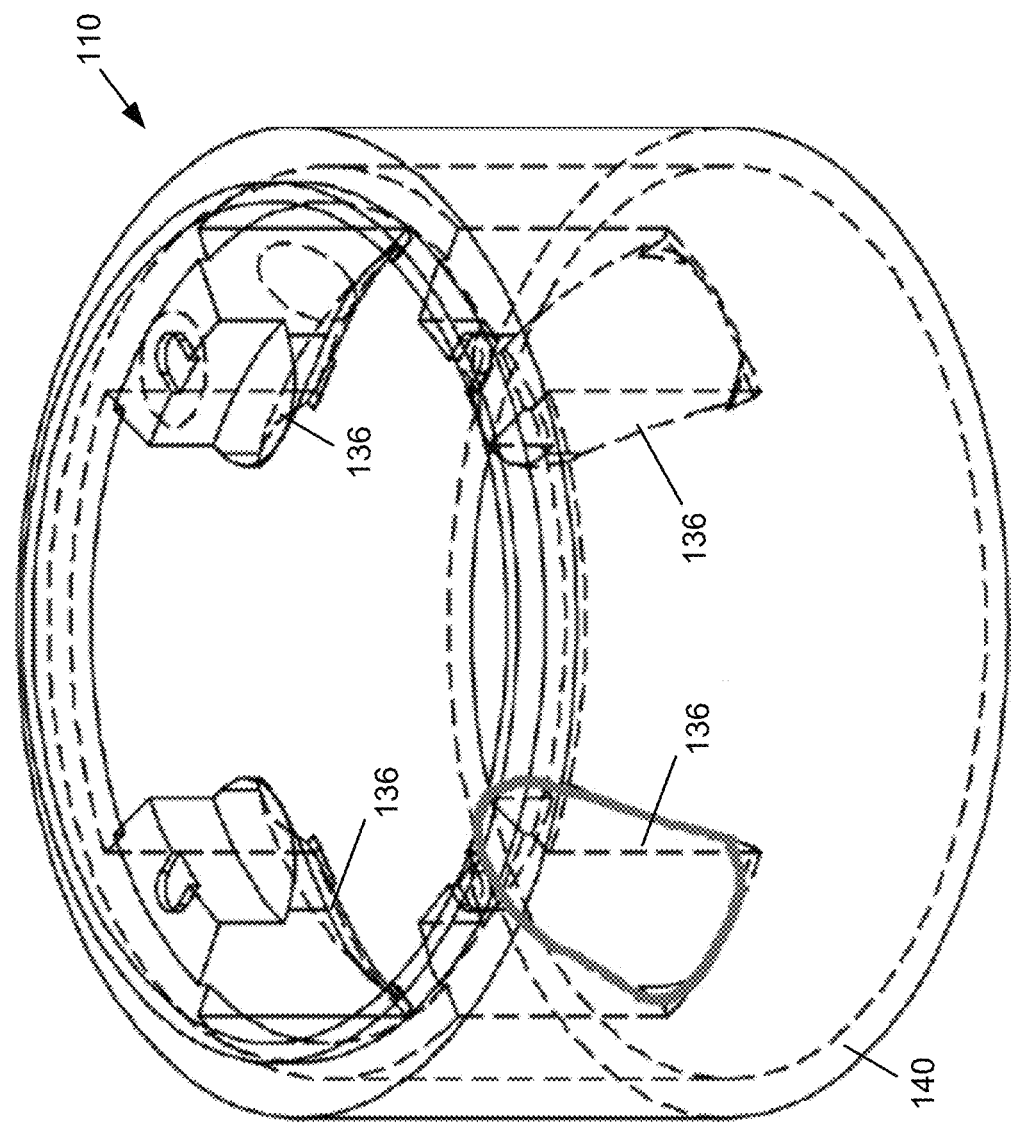
Figure 1M:
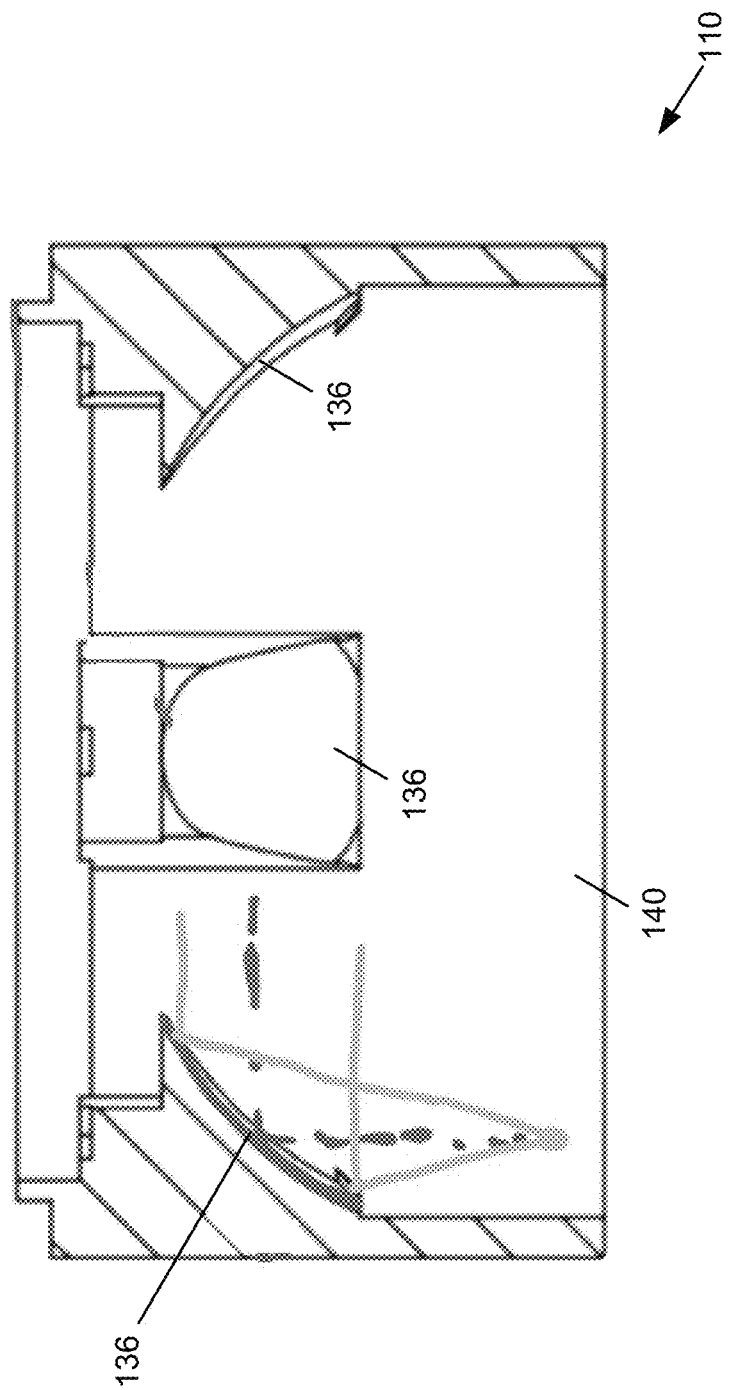

Referring to FIGS. 1K, 1L, and 1M, some embodiments may include also a reflective surfaces assembly 110 comprising a reflective surfaces housing 140, one or more reflective surfaces 136, a reflective element 132, and a selector mechanism 130. The reflective surfaces assembly 110 may be positioned between the sensor circuit board 134 and the receiving area 119. Certain embodiments of the reflective surfaces assembly 110 may be constructed as a single unit sized and shaped to fit inside the main body housing 104 and may include one or more stationary reflective surfaces 136 disposed radially about a central opening 137 on an inner surface of the reflective surfaces housing 140. When the reflective surfaces assembly 110 is in position in the main body housing, the reflective surfaces 136 positioned radially about the inner surface of the reflective surfaces housing 140 may be configured to align with each of the radially distributed light sensors 120 (one reflective surface per sensor) positioned on the sensor circuit board 134. Each of the reflective surfaces 136 may include a shape and surface suited to direct light to and from a sensor. For example, a rough reflective surface may introduce some smoothing of the light distribution, or a curved surface may impact the beam size of the light at the spot it hits a sensor. In this way, the reflective surfaces 136 may be configured to control various properties of the sensors and light sources in the sensor head 118. These properties may include, for example, the direction, diffusions, and convergence of reflective light towards and from a sensor or light source. The reflective surfaces 136 may be constructed of, for example, a polished metal, a mirror, or a coated reflective surface.

A reflective element 132 may be attached to a rotatable mount (not explicitly shown) and positioned within the central opening 137 of the reflective surfaces housing 140 such that the reflective element 132 may be in the path of light traveling through the central axis of the apparatus. The reflective element 132 may include one or more mirrors (e.g., dichroic mirror), prisms, glass, or a coated surface (e.g., a metal coated surface such as glass coated with a transparent film of aluminum deposited on the surface using vaporized aluminum or a dichroic material). The reflective element 132, positioned in the light path, may be configured to direct incoming or outgoing beams of light to and from a reflective surface 136 and then to a specific sensor or light source 120, 122, 124. For example, a reflector element 132 may be configured to direct incoming light to an RGB sensor 120 by rotating the mount in order to adjust the angle of the reflector element 132 such that the incoming light may be directed off one of the reflective surfaces 136 and into the RGB sensor 120. Certain embodiments may include a reflector element 132 that is a ratiometric 50/50 beam splitter attached to the rotatable mount and positioned within the central opening 137 of the reflective surfaces unit 110. The ratiometric beam splitter 132 may direct half of the light to one of the sensors on the periphery of the sensor board using its respective reflective surface and while permitting half the light to pass through the beam splitter and impact a power meter (e.g., a photodiode) positioned centrally on the sensor board 134. In some embodiments, the reflector element 132 may use a ratiometric beam splitter that implements ratios other than 50/50, depending on the associated sensors and the specific application of the apparatus 102.

Referring to FIG. 1F, selector mechanism 130 (e.g., a selector knob) may be connected to the rotatable mount. The selector mechanism 130 may be configured to rotate the mount and the reflector mechanism 130 to control the angle of the reflector element 132 through a mechanical linkage. Preferably, the selector mechanism 130 and mechanical linkage may be configured to direct a rotating beam of light 160 to and from a certain reflective surface 136 and then to a sensor 120, 122, 124. For example, the selector mechanism 130 may travel a certain distance in a slot 164 in the main housing body corresponding to a first position that rotates the mount and simultaneously adjusts the reflector element such that the beam of light is directed to a first reflective surface and then from the first reflective surface 136 to a first sensor 120, 122, 124. The selector element 130 may then be moved to a second position that rotates the mount and adjusts the reflective element such that the light beam is directed to a second reflective surface (not shown) and then on to a second sensor (not shown). This rotation is indicated by dashed arrows 166a, 166b. This process may be repeated for each sensor/reflective surface pair in the apparatus. In some embodiments, the ratiometric beam splitter may transmit a portion of the light emitted by a peripheral light source on the sensor board (the remaining portion exits). The transmitted portion of the light may then be reflected by the opposing reflective element onto the peripheral sensor on the opposite side of the sensor board. This allows the device to self-characterize using opposing peripheral sensors. Likewise, turning the ratiometric splitter holder by 180 degrees may allow any peripheral light source on the sensor board to reflect a known fraction of the light onto the power sensor placed centrally on the sensor board, allowing the power to be measured.

Certain embodiments may also include a receiving area 119 (e.g., one or more slots) at the proximal end 106 or distal end 108 of the main body housing 104 configured to receive one or more converging lenses, light filters, diffuser elements, or fixed-sized irises that may be used to control, for example, the amount/intensity of incoming light or wavelength of light. Preferably, the one or more converging lenses, light filters, or fixed-size irises are removable and selectable by the user.

In certain embodiments, one or more control buttons or switches 168 may be disposed along the main housing body 104 and in communication with the microcontroller assembly 114 comprising the microprocessor(s) 116 to control the function of the apparatus 102. The apparatus 102 may include further an adapter 112 disposed at the proximal end 106 or the distal end 108 of the main body housing 104 for attachment to a microscope or viewing device. The adapter 112 may include, for example, a threaded adaptor, a friction fit adaptor (i.e., snap on), a clamp-on adaptor, a magnetic attachment adapter, or other such adapter known in the art that is suitable for connecting the calibration apparatus 102 with a microscope. In some embodiments, the apparatus may be fixedly attached to the microscope or viewing device.

Certain embodiments may include a display screen 126 disposed on or at least partially within the main body housing 104, and may be in communication with the microcontroller assembly 114. The display screen 126 may be configured to allow users to view, for example, various instructions, calibration measurement outcomes, device and apparatus settings, and status of the apparatus 102.

Certain embodiments may be used to calibrate one or more fluorescence microscopes such that collected data from one fluorescence microscope may be comparable quantitatively to data collected from another fluorescence microscope. Additionally, certain embodiments may be used to ensure the repeatability of data collection for a given fluorescence microscope over time.

Calibration of a fluorescence microscope may be achieved using an embodiment of an apparatus 102 to measure excitation power levels at discrete instrument settings (e.g., the settings of the microscope used in in the collection of data for certain experiments). For example, the microscope objective may be removed, and the apparatus 102 attached to the microscope in place of the objective using the adapter located at the proximal end 106 of the main body housing 104. Once in position, the apparatus 102 may measure the amount of light the microscope system delivers to the backside of the objective. The apparatus 102 may include a receiving area 119 (e.g., slots) in the housing body 104 to receive one or more irises 128 of fixed-size that may be matched to the diameter of the back opening of the objective to limit the area of the sample impacted by excitation light. In this way, an iris 128 limits the sensitivity of the power sensor to the amount of excitation light that would be transmitted by the objective into the sample. Alternatively, for low numerical aperture objectives, the apparatus may be positioned in sample holder during calibration.

Activation of the light source 124 positioned in the sensor head 118 may simulate the emission light detected in an experiment of interest. The emission light signal may be either of a broad wavelength range—in which case the emission filters inside the microscope may be used to restrict the color detected—or the emission light signal may be of a narrow range of wavelengths similar to the emission spectrum of various dyes or fluorophores. When the emission light signal is of a narrow range of wavelengths, the emission filters may act to restrict the color, resulting in less background signal. Measuring the signal detected by the microscope for a known and fixed input signal from the apparatus may allow a user to track performance and alignment of the microscope excitation light source over time.

Additionally, the described embodiments may be used to detect overfill of the back-aperture. Overfill of an objective generally may indicate the microscope may be poorly aligned. In such scenarios, insets—made of a light diffusing material (e.g., glass, acrylic) having a central ring configured to match the size of the back aperture of the objective may be inserted into the slots to replace an iris. Once in position, the insets may absorb light that may typically pass through the objective but may scatter light to the periphery that is not blocked by the central obscuration. A light sensor 120 in the apparatus 102 may then detect the scattered light that would otherwise be blocked by the objective indicating the overfill.

Alternatively, when using certain aperture objectives and/or air spaced objectives with the microscope, the apparatus 102 also may be configured, for example, to have the form of a cover glass, a tissue culture dish used for imaging (typically 35 mm, glass bottom dish) or a 12 well plate (96 well, 384 well have the same outer form factor) and may be placed in the position of the sample. In this way, embodiments may be "formed" or otherwise configured to be used in devices other than microscopes such as, for example, in robotic devices to calibrate on-board imaging devices.

In some embodiments, the apparatus 102 may be configured in the form of a microscope objective that may be attached to the objective turret of the microscope in an unused objective mounting aperture (or in the available aperture after removal of an objective) for microscope calibration (e.g., excitation characterization and/or detection device characterization). The objective form factor of the apparatus 102 may be varied such that it fits within given space constrains, or simply minimized to be as small as possible. In this way, the apparatus 102 may be installed and stored on the turret like an unused objective during operation of the microscope. Doing so may eliminate the need to repeatedly remove and unmount the apparatus, during which an objective may be damaged. The apparatus 102 in the form of a microscope objective also may be moved into place through the operation of an automated turret during an experiment, to capture reference data to monitor performance of the microscope or detector over time, and, specifically, during lengthy experiments.

FIGS. 2A through 2K illustrate an alternative example embodiment of the apparatus 102 shown in FIG. 1A. The apparatus 202 of this example embodiment is substantially smaller than apparatus 102, and is configured to be mounted onto a microscope turret 302 in an empty objective slot, as shown in FIG. 3.

The basic operation of apparatus 202 corresponds to the operation described herein of apparatus 102, with certain differences due to the smaller size and different form factor of apparatus 202. Revisions in the apparatus 202 embodiment are concerned with improvements of the physical footprint and ease-of-use. For example, the footprint of apparatus 202 is reduced with respect to apparatus 102 to the size of an oversized objective. This allows the apparatus 202 to remain in the objective turret 302 while using the microscope, removing the need to install and remove the apparatus 202 for microscope characterization.

The microcontroller assembly of apparatus 202 may include a wireless transceiver (e.g., Bluetooth®, WiFi, Zigbee, a cellular protocol such as 3G, 4G, or 5G) to facilitate cloud connectivity, so that, for example, apparatus 202 may be operated and/or updated over the Internet or other communication network. Such connectivity may also enable automated online storage of measurement results and wireless communication with the microscope computer. In the apparatus 202, the number of optical and mechanical components is reduced as compared to apparatus 102, to reduce size and cost. The apparatus 202 has more overfill detectors as compared to apparatus 102 so that the beamcenter may be determined through triangulation, which allows the apparatus 202 to track excitation alignment. The display of the apparatus 202 has been simplified, as compared to the apparatus 102, to an 8×8 matrix. The apparatus 202 includes an indicator ring of 16 RGB LEDs to provide state signaling to the user.

A navigation ring drives a rotary encoder with click function, allowing the user to control the apparatus 202 by navigating basic menus and changing settings. The cloud connectivity, however, removes the requirement for most physical interactions between the user and the apparatus 202. The housing may include two more buttons and an RGB LED status indicator on the side to set up, reset and monitor the microcontroller and its connection to the cloud.

The primary optical path of the apparatus 202 has been redesigned and compressed, as compared to the apparatus 102. The back-reflection of the surface of the silicon photodiode (used to measure the excitation power) may also be used to guide and steer the outgoing light. To do so, the photodiode is placed on an adjustable gimbal plane under an angle, allowing the output of the broad-spectrum LED light-source (corresponding to temperature source 122 of apparatus 102) to be reflected out of the main aperture by means of the photodiode back-reflection. In doing so, the photodiode can accurately measure the light output of the apparatus 202, enabling self-calibration and stabilization. The gimbal mount of the photodiode allows tip and tilt adjustment of the outgoing beam, whereas a small convex lens with adjustable distance to the broad-spectrum LED can adjust the focus. Together, these adjustment opportunities allow the apparatus 202 output to be tuned to fit the particular optical and geometrical properties of the associated microscope.

By using the photodiode as the main reflective element, the need for a complex optical selector (i.e., selector mechanism 130 of apparatus 102) is removed, which greatly reduces the number of optical and mechanical components needed to facilitate the use of various sensors and light sources in concert. It also makes it more straightforward to incorporate sensors near the aperture—a fact that is exploited by the incorporation of three overfill detectors behind a diffuser with an aperture that matches the objective back-aperture of the intended objective. The placement of these overfill detectors allows the centroid of the beam to be estimated through triangulation, so that the apparatus 202 operates as a useful alignment tool, as well as allowing the excitation alignment to be tracked.

The apparatus 202 drastically reduces the need for user interaction. The apparatus 202 may have an orientation sensor (not explicitly shown, although the tilt sensor 238 may be used instead of or in addition to the orientation sensor), which detects when apparatus 202 is moved to the active objective position (i.e., by rotating the objective turret). Detecting when the apparatus is in the active objective position may initiate the excitation calibration procedure, the results of which may be automatically uploaded to a cloud database. The user may be informed of completion, at which point the apparatus 202 may be rotated out of the active objective position and the user can resume their experiments—all in a matter of seconds, without the need for user input or record-keeping on the part of the user.

The apparatus 202 includes a threaded base assembly (TBA) located at the bottom of the tool. The TBA is clamped into the base of the apparatus 202, allowing the apparatus to be exchanged for use with different microscopes. The free rotation of the TBA with respect to the apparatus also allows the rotational orientation of the apparatus, with respect to the microscope user, to be adjusted, making it easier to operate the device and read out the display.

The TBA may include all microscope-specific components of the apparatus 202, allowing most of the apparatus 202 to remain untouched when configuring the device for a specific microscope or objective. The TBA may include an outer thread that mounts the objective into the turret or side-port of the microscope. The minimum diameter is designed for RMS objectives, so the TBA can be made for most common objective/port thread (i.e., M25, M32, C-mount, SM1). The TBA may include a diffuser with a circular aperture that matches the back-aperture of the microscope objective. This facilitates overfill detection and allows misalignment to be detected and tracked. The TBA may include an optional lens that can accommodate exotic microscope configurations (e.g., high excitation beam diameter, or very long or complex emission paths). The TBA may include an optional neutral density or color filter to accommodate high-power or wide-spectrum excitation sources. Users that would like to use one apparatus 202 with multiple microscopes or very distinct objectives or modalities can exchange the TBA in a matter of minutes, or install multiple apparatus 202 into empty objective positions or side-ports.

FIGS. 2I, 2J, and 2K depict cross-section views of apparatus 202, which reveal the positioning of the main optical components. A small focusing lens 252 allows the defocus and scaling broad spectrum light source on the detector, whereas the gimbal mount 254 that positions the photodiode 256 facilitates tip and tilt of the outgoing calibration beam 258. The threaded bottom assembly 250 (TBA) is clamped onto the bottom of the apparatus 202 and can be exchanged to make the apparatus 202 compatible with a variety of microscopes and objectives.

Figure 2B:
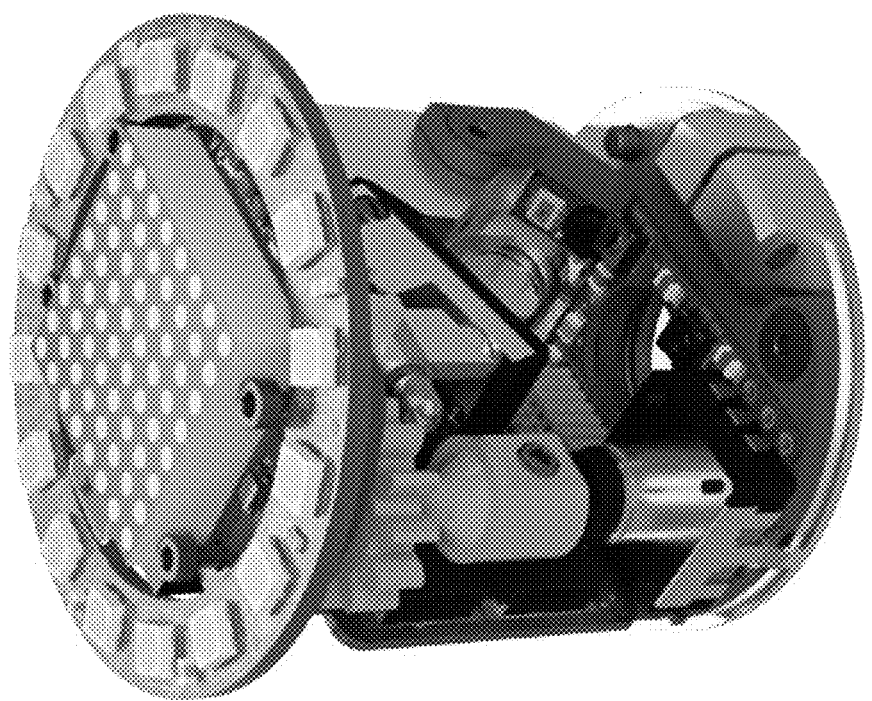
Figure 2A:
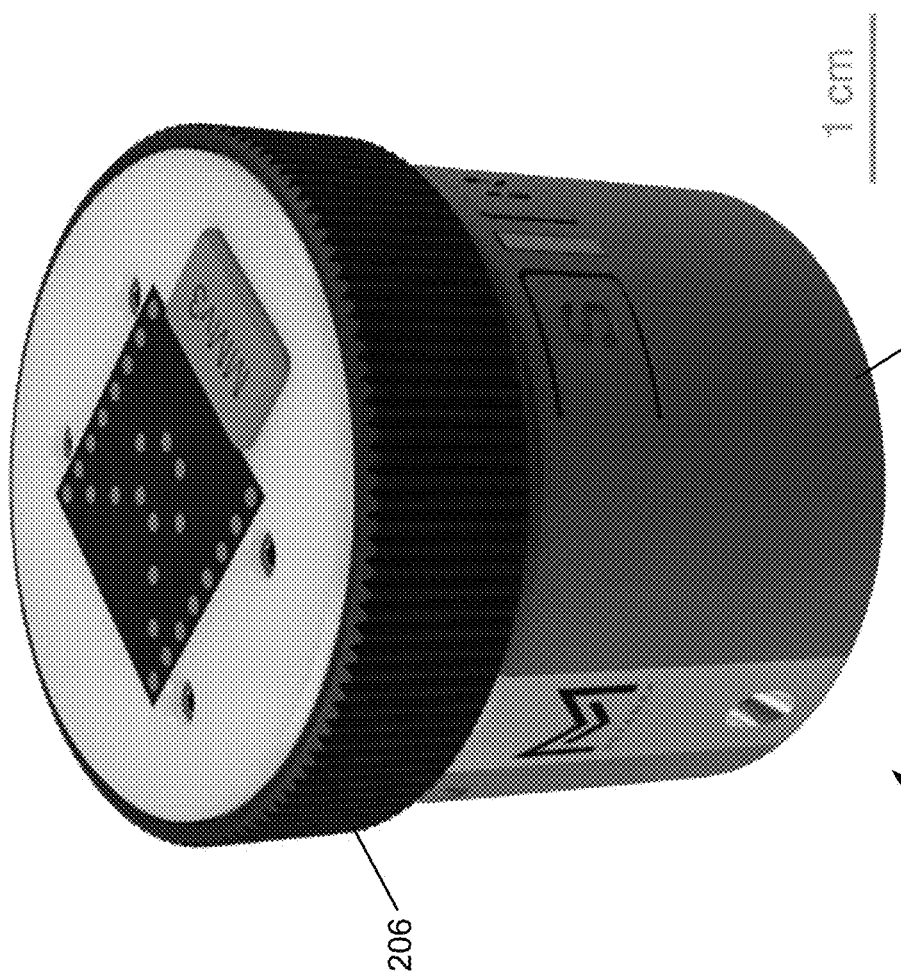
Figure 2D:
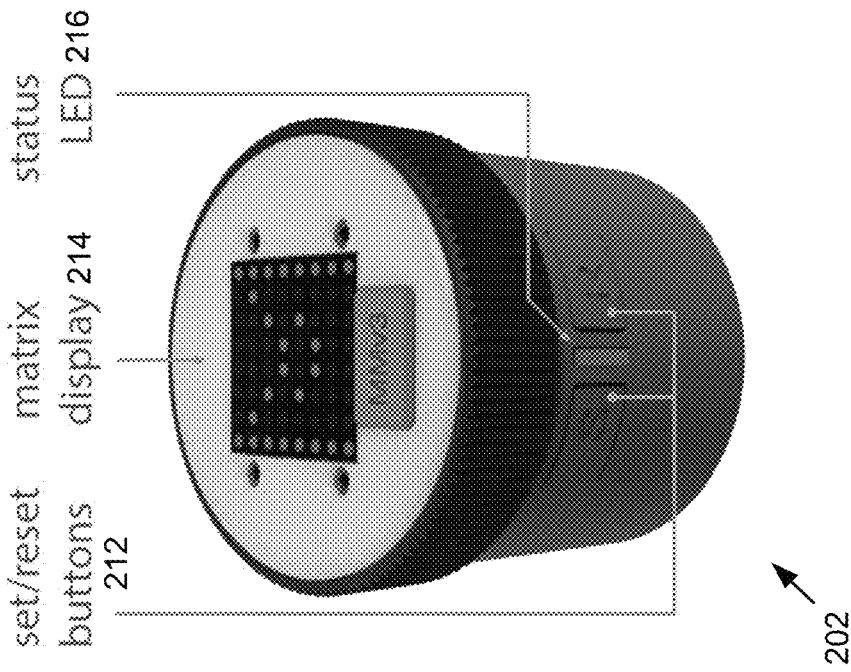
Figure 2C:
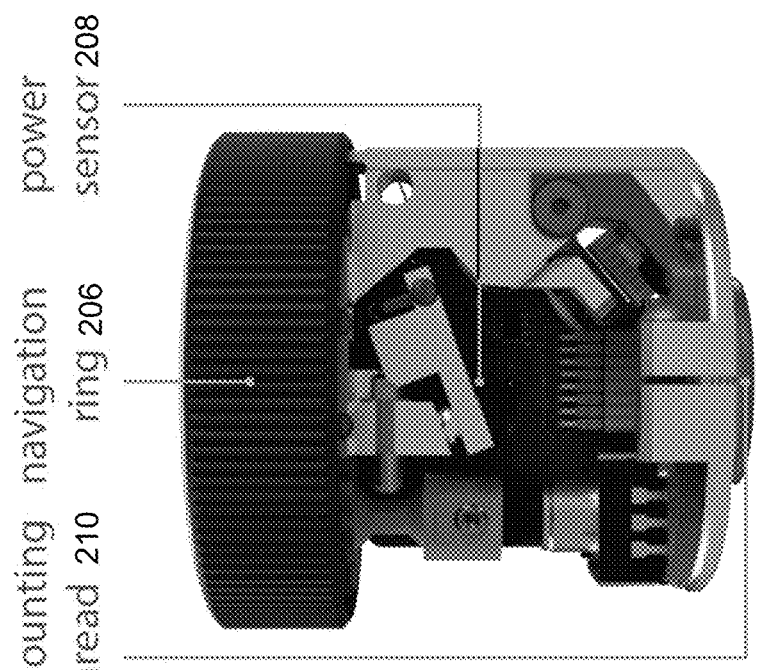
Figure 2H:
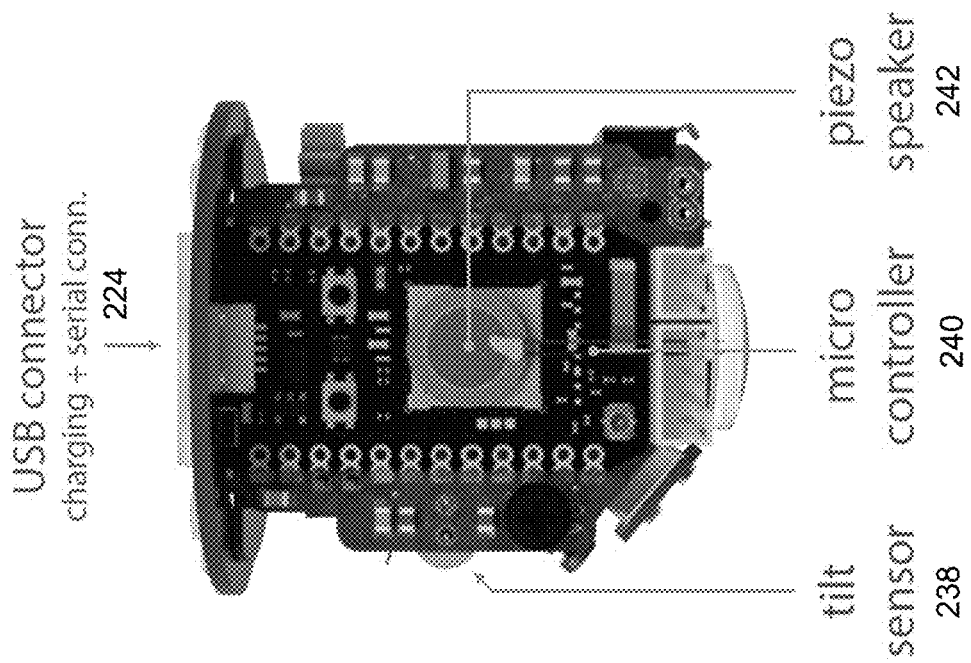
Figure 2G:
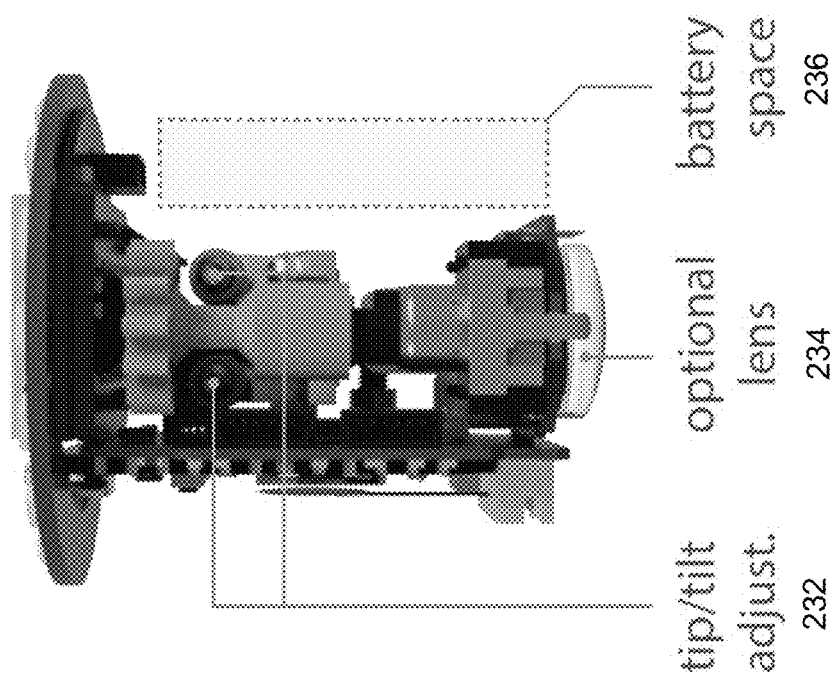
Figure 3:
FIG. 3 illustrates an alternative example embodiment of the apparatus mounted in a microscope turret, according to the invention.

The apparatus 202 FIG. 2A shows the apparatus 202 completely assembled, and FIG. 2B shows the apparatus 202 with the housing 204 and navigation ring 206 removed. FIG. 2C shows the apparatus 202 with the housing 204 removed but with the navigation ring 206 in place, along with the power sensor 208 and a mounting thread 210 for attaching the apparatus 202 to a microscope turret 302. FIG. 2D shows an alternative view of the apparatus 202 fully assembled, showing set/reset buttons 212, a matrix display 214, and a status LED 216. FIG. 2E shows the apparatus 202 with the navigation ring 206 removed, showing the indicator ring 218, charging indicators 220, a room light sensor 222, and a USB connector 224 for charging and serial data communication. FIG. 2F illustrates the apparatus 202 with the housing 204 and the navigation ring 206 removed, showing the diffuser aperture 226, the optical axis 228, and the focus adjust 230. FIG. 2G illustrates the apparatus 202 with the housing 204 and the navigation ring 206 removed, showing the tip/tilt adjust 232, an optional lens 234, and a space 236 for a battery. FIG. 2H illustrates the apparatus 202 with the housing 204 and the navigation ring 206 removed, showing the tilt sensor 238, the microcontroller assembly 240, and a piezo speaker 242.

Figure 4:
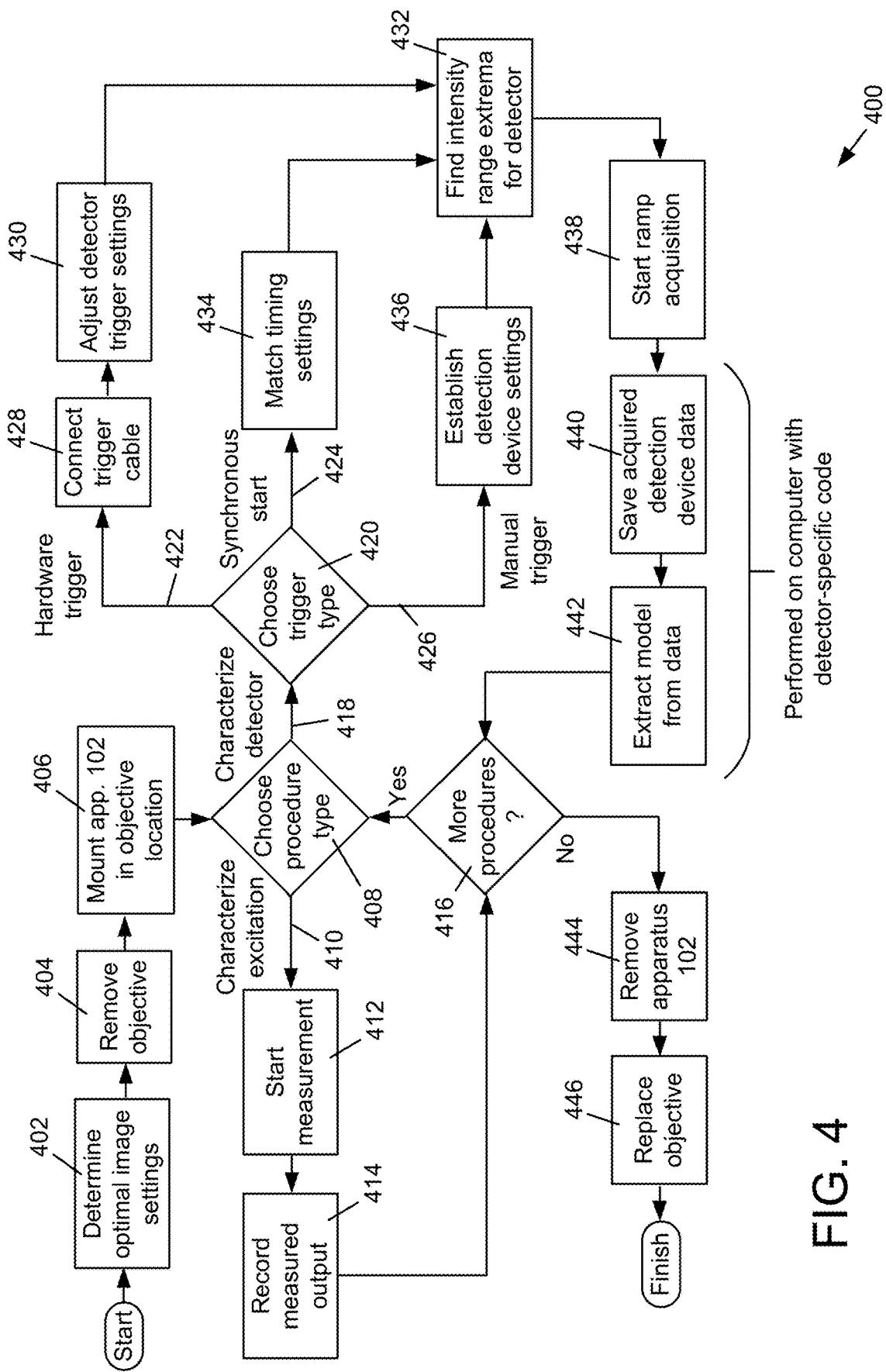
FIG. 4 shows an example calibration/characterization procedure, according to the invention.

The described embodiments may also be used to calibrate a detection device, such as a CCD camera, configured to capture and image emission light. With reference to FIG. 4 the apparatus may calibrate the detection device by creating a series of intensity ramps of a light signal (that is, a series of light signals with a known, linearly increasing power intensity), which may then be captured in a series of images using the microscope and the detection device. These measurements may be compared to emission light data (e.g., images) previously captured, to determine the amount/intensity of light signal received by the detection device. The user may then adjust, based on the comparison of emission light data of the intensity ramps and experimental data, the various detection device settings to optimize emission light capture.

At the start of the example calibration/characterization procedure 400 shown in FIG. 4, optical image settings are determined 402, the microscope objective is removed 404, and the apparatus 102, 202 is mounted 106 in the removed objective's location in the microscope turret. A procedure type is then chosen 408. If the excitation characterization 410 is chosen, the excitation measurement is started 412, the measured output is recorded 414, and it is determined 416 if more procedures are required.

If the detection device characterization 418 is chosen, a detection device trigger type is then chosen 420, one of a hardware trigger 422, a synchronous start 424, or a manual trigger 426. If the hardware trigger 422 is chosen, a trigger cable is connected 428 between a triggering source and the detection device. The detection device trigger settings are adjusted 430 suitable to the characterization procedure and the triggering source, and extrema of the measured intensity range are determined 432 for the detection device. This determination 432 is common to the three trigger types described above. In a cloud-based implementation use case, triggering may be done through communication (e.g., wireless Internet-based communication) with software running on the microscope computer that gathers and analyzes the images from the microscope detector, all the while controlling the apparatus 102, 202 to produce and measure the appropriate calibration signal.

If the synchronous start 424 trigger type is chosen, timing settings for the synchronization are matched 434, and extrema of the measured intensity range are determined 432 for the detection device.

If the manual trigger 426 is chosen, camera and detection device settings are established 436, and extrema of the measured intensity range are determined 432 for the detection device. For all three trigger types 422, 424, 426, once extrema of the measured intensity range are determined 432, the ramp acquisition procedure is started 438, the acquired detection device data is saved 440, a model of the detection device is extracted 442, and it is determined 416 if more procedures are required. Saving the acquired detection device data and extracting a model of the detection device from the saved data may be performed by an external computer executing detector-specific code. The acquired data may be conveyed to the external computer by a wireless link from the apparatus 102, 202 to the external computer. In some embodiments, no image data (from the detection device) needs to be saved, because the data may be analyzed 'on the fly' by software running on the microscope computer, and the calibration results may be wirelessly uploaded to cloud-based resources. This removes the need to save and transmit large amounts of image data and makes the calibration procedure less time-consuming for two reasons. First, the analysis of the calibration data may be performed automatically and during the image acquisition. Second, as the calibration data is analyzed on the fly, the software may determine when enough data was gathered to calibrate the device, removing the need to collect an over-abundance of data.

If more procedures are required, a procedure type is once again chosen 408. If no more procedures are required, the apparatus 102, 202 is removed 444 from the objective position in the turret, and the objective is replaced 446.

For the ramp acquisition procedure, the intensity ramps of the light signal may start below the detection limit of the detection device and may then increase until reaching the saturation point of the detection device. Further, by measuring the intensity-dependent variance, the apparatus 102, 202 may be used to analyze the noise characteristics of the detection device over the range of intensities used in the experimental data. Thus, tracking the detection device calibration over time may permit a user to monitor quantitatively the detection device performance and, for example, to compare images from different microscopes or the same microscope at different times. Alternatively, the intensity ramps may be pulsed, varied in pulse length, and the intensity of the ramp may increase or decrease over time to capture light intensity at smaller timescales (such as those present during characterization of fluorescence lifetime imaging field) than may be possible using the previously described intensity ramps.

Alternatively, calibration may also be achieved without knowledge of the absolute intensity of the light generated by the calibration apparatus 102, 202. In such scenarios, the power of the light may be lowered to the point where the detector has zero signal and then increased linearly from that bottom point to saturation of the detector. Next, using a noise model and advanced image analysis, it may be possible to measure the number of photons inside a diffraction limited spot. This measurement may be achieved also through the use of the electron to photon conversion factor of the camera, but a noise model may be more exact over a wider range of light intensities. Measuring the actual saturation level of the detector/camera allows also a simpler form of image analysis in which the absolute signals of different objects in an image are compared—without an absolute value for the power—as a reliable ratio of intensities (e.g. x is 10 times brighter then y).

The apparatus 102, 202 may be used as a stand-alone calibration module or may be used in cooperation with another computer. For use as a stand-alone module, the apparatus 102, 202 may include wireless connection capability (e.g., Bluetooth, Zigbee, WiFi, et al.) and may be locally powered by a battery (e.g., Lithium-ion, Lithium polymer, et al.). Additionally, the apparatus 102, 202 may be used with an external screen such as a computer monitor. The external screen may be connected to the apparatus 102 by a wired connection or a wireless connection. Alternatively, the apparatus 102, 202 may be controlled through a mobile phone (or other mobile device) application. Certain embodiments of the apparatus 102 may cause the microscope to execute certain functions, such as, for example, capturing an image, changing settings or imaging parameters, or activating the microscope light source. Some embodiments of the apparatus 102, 202 may be integrated into the microscope itself. For example, the apparatus 102, 202 may be situated in the light path of the microscope. In some embodiments, connectivity with a smartphone, a computer, microscope computer (for detector calibration) etc., can take place wirelessly through a cloud-based intermediary. In the case of example apparatus 202, the microcontroller assembly (e.g., Particle Photon device) is connected to the Particle IoT cloud, which serves as an intermediate between the microcontroller assembly, and other software/hardware that may interact with it.

It is further contemplated that the microprocessor(s) 116 within the apparatus 102, 202 and/or other external devices (e.g., another computer, monitor or hand-held device) may be configured to execute software to analyze the measurements captured by the external devices and/or apparatus 102, 202 during the calibration process. The apparatus 102, 202 may be configured to execute an imaging protocol on the microscope and automatically extract key values (e.g., excitation light power output, emission light output, et al.) from the collected measurements. The apparatus 102, 202 may use the extracted key values to adjust its own calibration protocol to conduct a full calibration cycle (or parts of a full calibration cycle) autonomously, that is, without user input.

Figure 5:
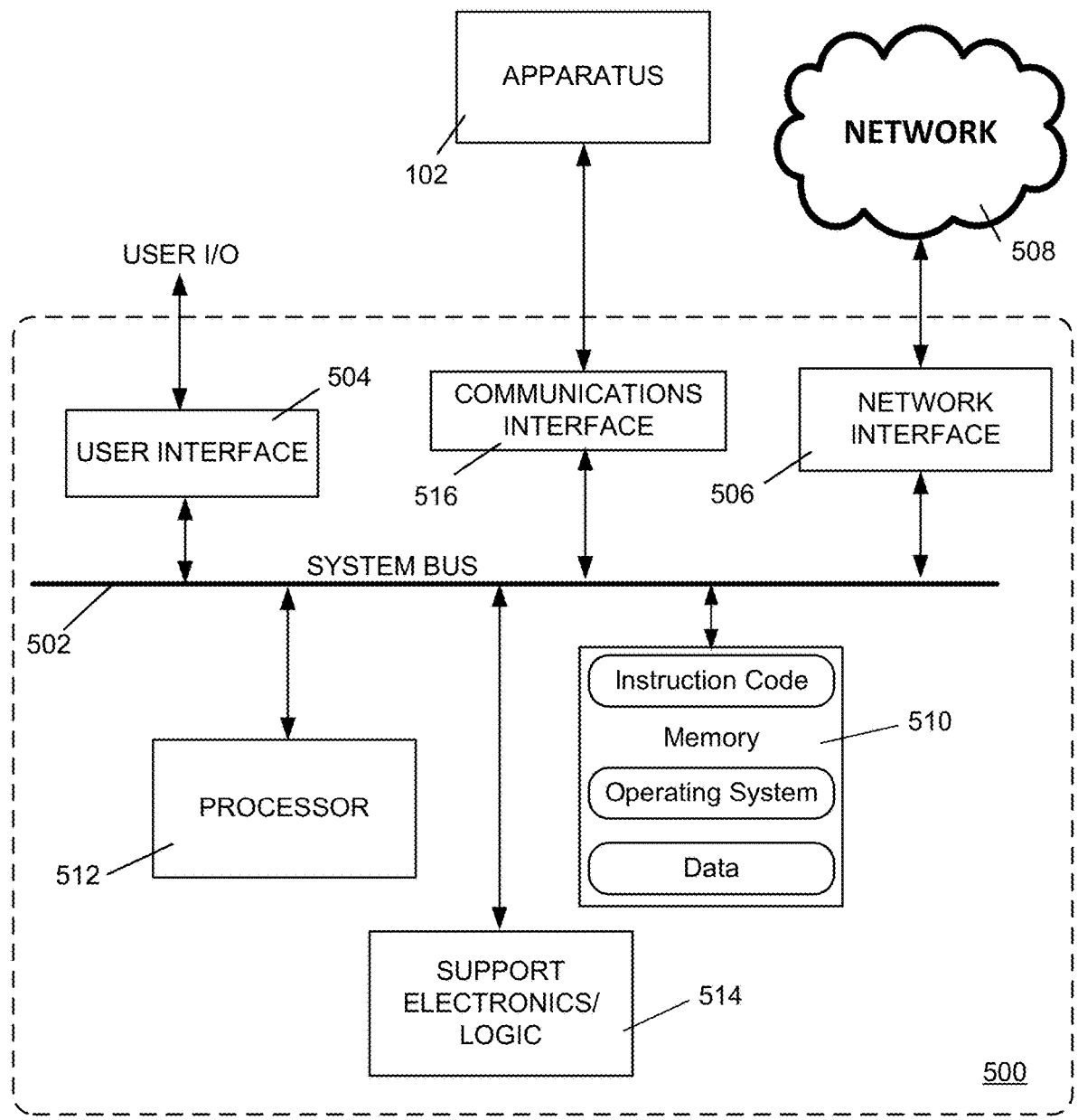
FIG. 5 illustrates an example internal structure of a processing system that may be used to implement one or more of the embodiments described herein.

FIG. 5 is a diagram of an example internal structure of a processing system 500 that may be used to implement one or more of the embodiments herein. Each processing system 500 contains a system bus 502, where a bus is a set of hardware lines used for data transfer among the components of a computer or processing system. The system bus 502 is essentially a shared conduit that connects different components of a processing system (e.g., processor, disk storage, memory, input/output ports, network ports, etc.) that enables the transfer of information between the components.

Attached to the system bus 502 is a user I/O device interface 504 for connecting various input and output devices (e.g., keyboard, mouse, displays, printers, speakers, etc.) to the processing system 500. A network interface 506 allows the computer to connect to various other devices attached to a network 508. Memory 510 provides volatile and non-volatile storage for information such as computer software instructions used to implement one or more of the embodiments of the present invention described herein, for data generated internally and for data received from sources external to the processing system 500.

A central processor unit 512 is also attached to the system bus 502 and provides for the execution of computer instructions stored in memory 510. The system may also include support electronics/logic 514, and a communications interface 516. The communications interface may accept acquired data from the apparatus 102, 202 during a calibration procedure, as described with reference to FIG. 4.

In one embodiment, the information stored in memory 510 may comprise a computer program product, such that the memory 510 may comprise a non-transitory computer-readable medium (e.g., a removable storage medium such as one or more DVD-ROM's, CD-ROM's, diskettes, tapes, etc.) that provides at least a portion of the software instructions for the invention system. The computer program product can be installed by any suitable software installation procedure, as is well known in the art. In another embodiment, at least a portion of the software instructions may also be downloaded over a cable communication and/or wireless connection.

It will be apparent that one or more embodiments described herein may be implemented in many different forms of software and hardware. Software code and/or specialized hardware used to implement embodiments described herein is not limiting of the embodiments of the invention described herein. Thus, the operation and behavior of embodiments are described without reference to specific software code and/or specialized hardware—it being understood that one would be able to design software and/or hardware to implement the embodiments based on the description herein.

Further, certain embodiments of the example embodiments described herein may be implemented as logic that performs one or more functions. This logic may be hardware-based, software-based, or a combination of hardware-based and software-based. Some or all of the logic may be stored on one or more tangible, non-transitory, computer-readable storage media and may include computer-executable instructions that may be executed by a controller or processor. The computer-executable instructions may include instructions that implement one or more embodiments of the invention. The tangible, non-transitory, computer-readable storage media may be volatile or non-volatile and may include, for example, flash memories, dynamic memories, removable disks, and non-removable disks.

Further modifications and alternative embodiments of various aspects of the invention will be apparent to those skilled in the art in view of this description. Accordingly, this description is to be construed as illustrative only and is for the purpose of teaching those skilled in the art the general manner of carrying out the invention. It is to be understood that the forms of the invention shown and described herein are to be taken as examples of embodiments. Elements and materials may be substituted for those illustrated and described herein, parts and processes may be reversed, and certain features of the invention may be utilized independently, all as would be apparent to one skilled in the art after having the benefit of this description of the invention. Changes may be made in the elements described herein without departing from the spirit and scope of the invention as described in the following claims.

While example embodiments have been particularly shown and described, it will be understood by those skilled in the art that various changes in form and details may be made therein without departing from the scope of the embodiments encompassed by the appended claims.

What is claimed is:

1. An apparatus for calibrating a microscope, comprising:
    a main body housing having an adapter configured to mechanically couple the main body housing to a microscope;
    a sensor head disposed within the main body housing, the sensor head comprising (i) an optical power sensor configured to produce a power signal representative of an optical power magnitude of light applied to the optical power sensor, and (ii) an optical wavelength sensor configured to produce wavelength information associated with the light applied to the optical wavelength sensor; and a microcontroller assembly in communication with the sensor head, the microcontroller assembly configured to generate an optical power magnitude value based on the power signal and to adjust the optical power magnitude value according to the wavelength information.

2. The apparatus of claim 1, wherein the optical wavelength sensor comprises a red-green-blue (RGB) optical sensor.

3. The apparatus of claim 1, wherein the optical power magnitude value is further adjusted according to a temperature of the optical power sensor.

4. The apparatus of claim 1, wherein the microcontroller assembly comprises a display, and wherein the microcontroller assembly is further configured to produce a calibration result based on the optical power magnitude value and to display the calibration result on the display.

5. The apparatus of claim 1, wherein the light applied to the optical power sensor is excitation light that the microscope uses to illuminate a specimen.

6. The apparatus of claim 1, wherein the sensor head further comprises a light source.

7. The apparatus of claim 6, wherein the light source is a broad-spectrum light source.

8. The apparatus of claim 6, wherein the light source is a multi-color light emitting diode.

9. The apparatus of claim 6, wherein the optical power sensor has a reflective surface, and the light source is configured to direct light toward a detection device by directing the light toward the reflective surface, thereby reflecting the light through a main aperture of the apparatus.

10. The apparatus of claim 1, wherein the sensor head further comprises a temperature sensor and one or more light sensors.

11. The apparatus of claim 1, further comprising at least one of a converging lens, an iris, and light filter disposed within the main body housing.

12. The apparatus of claim 1, wherein the microcontroller assembly further generates an estimate of a wavelength of the light applied to the optical wavelength sensor based on the wavelength information, generates the optical power magnitude value based on the power signal, and adjusts the optical power magnitude value according to the estimate of the wavelength of the light applied to the optical wavelength sensor.

13. The apparatus of claim 1, wherein the microcontroller assembly further comprises a wireless transceiver configured to wirelessly communicate with external transceiver connected to a communications network.

14. The apparatus of claim 13, wherein the communications network is the Internet.

15. The apparatus of claim 1, further comprising a reflector assembly comprising:
a reflective surfaces assembly including an interior surface defining a central opening;
one or more reflective surfaces radially distributed about the interior surface of the reflective surfaces assembly;
one or more reflective elements attached to a mount and positioned within the central opening in a path of incoming or outgoing light; and
a selector mechanism mechanically linked to the mount such that movement of the selector mechanism rotates the mount to adjust an angle of the one or more reflective elements to direct the incoming or outgoing light to the one or more reflective surfaces where the light is then reflected onto the one or more sensors.

16. The apparatus of claim 15, wherein the one or more reflective elements is a dichroic mirror or a prism.

17. The apparatus of claim 15, wherein the one or more reflective surfaces is a convex surface.

18. The apparatus of claim 1, wherein the apparatus is coupled, using the adapter, to an objective mounting aperture of an objective turret of the microscope.

19. The apparatus of claim 1, further comprising an orientation sensor that produces an orientation signal representative of an orientation of the apparatus, and wherein the microcontroller assembly initiates an excitation calibration procedure when the orientation signal indicates that the apparatus is in an active objective position.

20. An apparatus for calibrating a microscope, comprising:
a main body housing having an adapter configured to mechanically couple the main body housing to a microscope;
a sensor head disposed within the main body housing, the sensor head comprising (i) an optical power sensor configured to produce a power signal representative of an optical power magnitude of light applied to the optical power sensor, (ii) an optical wavelength sensor configured to produce wavelength information associated with the light applied to the optical wavelength sensor, and (iii) a light source configured to direct light toward a detection device associated with the microscope; and
a microcontroller assembly in communication with the sensor head, the microcontroller assembly configured to generate an optical power magnitude value based on the power signal and to adjust the optical power magnitude value according to the wavelength information, the microcontroller assembly further configured to calibrate the microscope and/or the detection device associated with the microscope.

21. The apparatus of claim 20, wherein a component on the sensor head has a reflective surface, and the light source is configured to direct light toward a detection device by directing the light toward the reflective surface, thereby reflecting the light from the reflective surface and through a main aperture of the apparatus toward the detection device.

22. A method of calibrating a detection device comprising:
providing an apparatus comprising:
a main body housing having an adapter configured to mechanically couple the main body housing to a microscope;
a sensor head disposed within the main body housing, the sensor head comprising (i) an optical power sensor configured to produce a power signal representative of an optical power magnitude of light applied to the optical power sensor, (ii) an optical wavelength sensor configured to produce wavelength information associated with the light applied to the optical wavelength sensor, and (iii) a light source configured to direct light toward a detection device associated with the microscope; and
a microcontroller assembly in communication with the sensor head, the microcontroller assembly configured to generate an optical power magnitude value based on the power signal and adjusted according to the wavelength information;
attaching the apparatus to the microscope or the detection device;

emitting light from the light source disposed on the sensor head;

detecting the light by a light sensor disposed on the sensor head;

calculating an intensity of light emitted by the light source;

measuring an intensity of light detected by the detection device;

comparing the intensity of light emitted by the calibration apparatus to the intensity of light detected by the microscope or light detector; and calibrating, by the apparatus, the microscope or detection device based upon a difference in intensity of light emitted by the apparatus and the intensity of light detected by the microscope or detection device.

23. The method of claim 22, wherein emitting light from the light source further comprises generating a series of linearly increasing intensity ramps of light, and capturing, by the microscope or detection device, an image of each of the series of linearly increasing intensity ramps of light.

24. The method of claim 22, further comprising comparing an intensity of light, detected by the microscope or the light detector in each of the series of linearly increasing intensity ramps of light, to an intensity of light emitted by the light source for each of the series of linearly increasing intensity ramps of light.

25. The method of claim 22, further comprising measuring the optical power magnitude value and storing the measured optical power magnitude value.

\* \* \* \* \*